United States Patent
Karasudani et al.

(10) Patent No.: US 6,378,054 B1
(45) Date of Patent: *Apr. 23, 2002

(54) DATA BACKUP DEVICE AND METHOD FOR USE WITH A COMPUTER, AND COMPUTER-READABLE RECORDING MEDIUM HAVING DATA BACKUP PROGRAM RECORDED THEREON

(75) Inventors: Akira Karasudani; Yasuhiko Nakano; Yoshiyuki Okada, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/047,361

(22) Filed: Mar. 25, 1998

(30) Foreign Application Priority Data

Aug. 4, 1997 (JP) .............................................. 9-209468

(51) Int. Cl.[7] .............................................. G06F 12/16
(52) U.S. Cl. ........................ 711/161; 711/162; 707/204
(58) Field of Search ................................ 707/202, 204; 711/161, 162

(56) References Cited

U.S. PATENT DOCUMENTS

| | | | | |
|---|---|---|---|---|
| 5,664,186 A | * | 9/1997 | Bennett et al. .............. 707/204 |
| 5,751,997 A | * | 5/1998 | Kullick et al. .............. 711/162 |
| 5,765,173 A | * | 6/1998 | Cane et al. .................. 707/204 |
| 5,813,017 A | * | 9/1998 | Morris ........................ 707/204 |
| 5,974,563 A | * | 10/1999 | Beeler, Jr. ....................... 714/5 |
| 5,987,575 A | * | 11/1999 | Yamaguchi .................. 711/162 |
| 6,014,676 A | * | 1/2000 | McClain ..................... 707/204 |

FOREIGN PATENT DOCUMENTS

JP  7-121410  5/1995

* cited by examiner

*Primary Examiner*—Do Hyun Yoo
*Assistant Examiner*—Gary J. Portka
(74) *Attorney, Agent, or Firm*—Staas & Halsey

(57) ABSTRACT

A technique related to a data backup for a computer. There are provided a selection section, an archive file creation section, and a backup processing section. The selection section selects data files satisfying given conditions from among data files stored in a first storage section. The archive file creation section creates N (N is a natural number) archive files by grouping the plurality of data files selected by the selection section and which repeats the archive file creation processing M (M is a natural number) times. The backup processing section stores the archive files created by the archive file creation section into a second storage section. The technique enables efficient copying of a data file in a short period of time.

15 Claims, 22 Drawing Sheets

| FILE NAME | DATE | FILE SIZE | PROCESSING STATUS |
|---|---|---|---|
| ¥home¥vlog¥bunsho.txt | 1997.1.12 14:00 | 1564 BYTE | ALREADY GROUPED |
| ¥home¥vlog¥gazou.jpg | 1997.1.13 9:05 | 18623 BYTE | ALREADY GROUPED |
| ¥home¥vlog¥soft.exe | 1997.1.13 10:11 | 982 BYTE | ← UNDER GROUPING PROCESSING |
| ¥home¥vlog¥biblio.txt | 1997.1.17 16:46 | 2471 BYTE | |
| . . . . | | | |

→ PROCESSING DIRECTION

FIG. 2

DATA BACKUP DEVICE AND METHOD FOR USE WITH A COMPUTER, AND COMPUTER-READABLE RECORDING MEDIUM HAVING DATA BACKUP PROGRAM RECORDED THEREON

BACKGROUND OF THE INVENTION (1) Field of the Invention

The present invention relates to a data backup device and method suitable for use with a computer and to a computer-readable recording medium having a data backup program recorded thereon.

(2) Description of the Related Art

In recent years, computers, such as personal computers, as well as computer networks dominantly comprising Internet and personal computer communication, have become prevalent. In association with this tendency, important data sets such as electronic mail or documents stored in a storage device of a computer have also increased.

The contents of the important data sets may be destroyed or become unavailable by the user's faulty operation of the computer or by a breakdown in the storage device. The loss of data results in significant damage in terms of time and money.

In a method of minimizing damage by immediately recovering a data file in the event of problems such as the loss of data, a technique of duplicating information (i.e., a data backup technique) becomes important.

As shown in FIG. 18, a computer 50 comprises a predetermined storage device 51 and a backup storage device 52. Data which are identical to the data stored in the storage device 51 are stored in the storage device 52, thereby preventing the foregoing damage.

With regard to common data backup methods, there are various data backup methods which vary among the types of data files to be reproduced (or copied) and the ways the data files are input or output. Each of the methods will now be described.

(a) Data backup methods varying with the types of data files to be copied

These data backup methods are classified into three methods according to the type of data file to be copied; that is, a full backup method, a differential backup method, and an incremental backup method.

(a1) Full Backup Method

According to this method, all the data files stored in an area in storage to be copied are copied at one time.

(a2) Differential Backup Method

According to this method, among the data files stored in an area in storage to be copied, the data files copied are those whose data have been updated or which have been newly created since the last backup version was created by full backup.

(a3) Incremental Backup Method

According to this method, among the data files stored in an area in storage to be copied, only the data file copied are those whose data have been updated or which has been newly created since the last backup version was created by full backup or differential backup.

(b) Data backup methods varying with the ways a data file is input or output

The processing time required for the data backup method is determined by a method of inputting or outputting a data file required when the data file is copied. The inputting and outputting of one data file involves open processing, read/write processing, and close processing. With reference to FIG. 19, an explanation will be given of copying of a file A stored in the storage device 51 (for holding the original file) to a file A' stored in the storage device 52 (for holding a copied file).

More specifically, the open processing is a process for making a data file available by extraction of information about the data file; e.g., the location of the data file in the storage device, the date on which the file was created, or the size of the data file.

The read/write processing is a process for reading contents from or into a data file and is designed to write the data read from the file A to the file A'. The close processing is a process for terminating utilization of a data file and is designed to discard information about the data file extracted at the time of open processing.

The following explanation describes the three types of data backup methods that vary with the file input-output processing methods.

(b1) Data Backup Method Utilizing Disk Image

Under this method, data are directly read from the storage device and written on another storage device without regard to a data structure configured in the storage device. For example, as shown in FIG. 20, raw data stored in the storage device 51 are stored in the storage device 52, exactly as they are.

Since this method disregards the data structure configured in the storage device, there is no need to execute open/close processing for the purpose of inputting or outputting data on a file-by-file basis, thus resulting in a reduction in processing time.

(b2) Data Backup Method Utilizing File Image (1)

Under this method, data are read on a file-by-file basis, and the thus-read data are written into another storage device on a file-by-file basis according to the data structure configured in the storage device. For example, as shown in FIG. 21, data concerning files A, B, and C stored in the storage device 51 are stored, respectively, in the storage device 52 on a file-by-file basis.

In short, this method enables data to be copied or restored on a file-by-file basis according to the data structure configured in the storage device and can be applied to the foregoing differential or incremental backup method.

(b3) Data Backup Method Utilizing File Image (2)

Under this method, data are read on a file-by-file basis according to the data structure configured in the storage device, and the thus-read data files are grouped into one data file. The data files are written into another storage device on a file-by-file basis. For example, as shown in FIG. 22, all the data sets concerning the files A, B, and C stored in the storage device 51 are collectively stored in the storage device 52.

This method enables data to be copied or restored on a file-by-file basis according to the data structure configured in the storage device. Further, since this method permits the data files read from the storage device 51 to be grouped into one data file and to be written into the storage device 52, execution of the open and close processing is required to be performed only once, collectively, in order to write the data files into the storage device 52.

More specifically, many commercially-available data backup software packages employ the foregoing method (b2). For example, a backup software package bundled with MS-Windows 95, which is commercially available from Microsoft Co., Ltd. and is an operating system (OS) for use in a personal computer, employs the data backup method (b2). In addition, ASCserver and Cheyenne Backup, which are available from Computer Associates Ltd., and Seagate Backup, which is available from Seagate Co., Ltd., also employ the foregoing method (b2).

In a case where user data comprising electronic mail or documents are copied in a personal computer which uses a 32-bit Pentium microprocessor of 90 MHz, through use of the backup software package bundled with MS-Windows 95, the processing rate determined from the processing time required to copy the data by measurement is 185 KB/s.

The foregoing data backup methods suffer the following problems. First, as mentioned previously in section (a) entitled "Data backup methods varying with the types of data files to be copied," under the differential or incremental backup method, if data are copied several times, there are required recording mediums having backup operations or backup data files recorded thereon in the number corresponding to the number of times the data are copied, resulting in an increase in the number of recording mediums. Further, in this case, when the copied data files are restored, they must be restored in the order in which they were copied.

To solve the foregoing problem, the number of backup data files or recording mediums must be reduced, and the copied data files must be restored in a simple manner. Accordingly, all the data files must be copied after the differential or incremental backup operation has been performed for a given period of time. In order to reduce the overall processing time required by a data backup system, the processing time required for the full backup operation must be reduced.

Next, in the case of data backup method (b1) utilizing a disk image described in section (b) entitled "Data backup methods varying with the ways a data file is input or output," since the data structure is disregarded, data cannot be copied on a file-by-file basis, which in turn makes it impossible to perform the differential or incremental backup operation. Further, the method involves reading of a null data set from an empty area in the storage device 51 and writing of the thus-read null data set to the other storage device 52, causing waste of resources.

In the case of data backup method (1) utilizing a file image referred to in section (b2), each of the storage device 51 (holding the original file) and the storage device 52 (holding a copied file) must open and close a data file on a file-by-file basis, requiring a longer processing time as compared with that required by method (b1).

In the case of data backup method (2) utilizing a file image referred to in section (b3), a data file is opened and closed once for each data file. Therefore, the processing time required by method (b3) can be reduced in comparison with that required by method (b2), but still remains longer than that required by method (b1).

SUMMARY OF THE INVENTION

The present invention has been contrived in view of the foregoing drawbacks in the art, and an object of the present invention is to provide a data backup device and method for use with a computer that enables efficient copying of a data file in a short period of time by making improvements in a data file to be copied.

Another object of the present invention is to provide a computer-readable recording medium having a data backup program for the purpose of performing the foregoing data backup operation recorded thereon.

To these ends, according to one aspect of the present invention, there is provided a data backup device for use with a computer which stores data files stored in a first storage section into a second storage section in a duplicated manner, the device comprising: a selection section for selecting data files satisfying given conditions from among the data files stored in the first storage section; an archive file creation section which creates N (N is a natural number) archive files by grouping the plurality of data files selected by the selection section and which repeats the archive file creation processing M (M is a natural number) times; and a backup processing section which stores the archive files created by the archive file creation section into the second storage section.

Since the data backup device according to the present invention groups the data files to be copied into archive files before the data files are copied, the time required to copy the data files can be reduced. Hence, the present invention yields the advantage of enabling significant improvements in the processing capability of the data backup device. Further, since the data backup device uses distributed processing to cause the archive file creation section to create an archive file and to cause the backup processing section to copy the thus-created archive file, the processing operations can be performed speedily and accurately, thus increasing the processing rate of the data backup device.

Preferably, in the data backup device according to the present invention, the selection section is configured to select a data file of a given size or smaller.

Since the data backup device according to the present invention is configured in such a way that the selection section selects a data file of a given size or smaller, the processing time and the size of the archive file to be stored can be limited. Accordingly, the storage capacity of the first storage section can be reduced.

Preferably, in the data backup device according to the present invention, the selection section is configured in such a way that when the archive file creation section is performing the $m^{th}$ operation (where "m" is a natural number satisfying $m \leq M$), the selection section selects only those data files which have been modified or newly created since the archive file creation section performed the $M-1^{th}$ operation.

Since the data backup device according to the present invention is configured in such a way that the selection section selects only those data files which have been modified or newly created since the archive file creation section created an archive file in the preceding processing, the number of data files to be grouped can be reduced, and the number of archive files can also be reduced. In this case, the backup processing rate of the data backup device can be increased.

Preferably, in the data backup device according to the present invention, the selection section is configured in such a way that when the archive file creation section is performing the $m^{th}$ operation (where $m \leq M$), the selection section selects only those data files which have been modified or newly created since the archive file creation section performed the first operation.

Since the data backup device according to the present invention is configured in such a way that, in a case where the number of archive files is increased, the selection section extracts the archive files created when the archive file creation section has performed the first operation and selects only the data files which have been modified or newly created since the archive file creation section performed the first operation, the number of data files to be grouped can be reduced. In this case, the number of archive files can be reduced.

Preferably, in the data backup device according to the present invention, the archive file creation section is configured in such a way that, after having created an archive file, the archive file creation section compresses the thus-created archive file.

Since the data backup device according to the present invention is configured so as to compress the created archive file, the size (amount of data) of the archive file to be stored can be reduced. The present invention yields the advantage of being able to reduce storage capacity of the first storage section for creating archive files or that of the second storage section for storing copied archive files or data files.

Preferably, in the data backup device according to the present invention, the archive file creation section is configured in such a way that, after having compressed each of data files, the archive file creation section creates archive files.

Since the data backup device according to the present invention is configured so as to create archive files after having compressed each of data files to be copied, data files can be newly added to the archive files without decoding the archive files, whereby archive files can created speedily.

Preferably, in the data backup device according to the present invention, the archive file creation section is configured in such a way that the archive file creation section adds the data file selected by the selection section during the $m^{th}$ operation (where $m \leq M$) of the archive file creation section to the archive files created during the $m-1^{th}$ operation of the same.

Since the data backup device according to the present invention is configured so as to add the data file to be newly updated to the archive file that has been created in the preceding grouping operation, the present invention yields the advantage of being able to create archive files by an extremely simple operation; that is, by addition of a data file to archive files.

Preferably, in the data backup device according to the present invention, the archive file creation section is configured in such a way that, after having deleted a past data file corresponding to a data file to be updated from the archive files, the archive file creation section adds the data file selected by the selection section during the $m^{th}$ operation (where $m \leq M$) of the archive file creation section to the archive files created during the $m-1^{th}$ operation of the same.

Since the data backup device according to the present invention is configured so as to delete a data file corresponding to a data file to be updated when a data file to be newly updated is added to the archive file that has been created in the preceding grouping operation, the amount of storage of the archive files can be reduced, and only the newest information can be copied to the second storage section.

Preferably, in the data backup device according to the present invention, the backup processing section is configured to store into the second storage section the archive files and those data files that have failed to satisfy given conditions.

Since the data backup device according to the present invention is configured so as to group data files to be copied into archive files before the data files are copied, the present invention yields the advantages of being able to reduce the time required to copy the data files and being able to significantly improve the processing capability of the data backup device. Further, since the data backup device uses distributing processing in performing the creation of an archive file in the archive file creation section and in copying the thus-created archive files in the backup processing section, the processing operations can be perform speedily and accurately, thereby increasing the processing rate of the data backup device.

Preferably, in the data backup device according to the present invention, the backup processing section is configured to compress the archive files and those data files that have failed to satisfy given conditions and then store the thus-compressed files into the second storage section.

Since the data backup device according to the present invention is configured so as to compress the archive files and the data files that have failed to satisfy given conditions when these files are copied to the second storage section, the present invention yields the advantages of being able to reduce the load exerted on the archive file creation section when the archive file creation section repeatedly creates archive files and being able to reduce the storage capacity of the second storage section to which the data files are copied.

Preferably, in the data backup device according to the present invention, the backup processing section is configured in such a way that, after having added to the archive files, another archive file or those data files that have failed to satisfy given conditions, the backup processing section stores the archive files into the second storage section.

Since the data backup device according to the present invention is configured so as to copy the archive files after the addition to the archive files or another archive file or those data files that have failed to satisfy given conditions, the number of files to be copied can be reduced. In this case, the present invention yields the advantage of being able to improve the copying capability of the data backup device.

Preferably, in the data backup device according to the present invention, the backup processing section is configured in such a way that, after having grouped into another archive file the archive files and those data files that have failed to satisfy given conditions, the backup processing section stores the thus-grouped archive files into the second storage section.

Since the data backup device according to the present invention is configured so as to copy the archive files and those data files that have failed to satisfy given conditions after these files have been grouped into another archive file, the user can speedily extract data on a per-unit basis easily available for the user.

Preferably, in the data backup device according to the present invention, the backup processing section is configured in such a way that the backup processing section causes the archive file creation section to create an archive file one time immediately before copying to the second storage section the archive files and those data files that have failed to satisfy given conditions.

Since the data backup device according to the present invention is configured in such a way as to allow the archive file creation section to create an archive file one time immediately before the archive files and those data files that have failed to satisfy given conditions are copied to the second storage section, the newest data file can be copied without fail, contributing to improvements in the performance of the data backup device.

According to another aspect of the present invention, there is provided a data backup method for use with a computer which stores the data files stored in a first storage section into a second storage section in a duplicated manner, the method comprising the steps of: selecting data files that satisfy given conditions from among the data files stored in the first storage section; creating N (N is a natural number) archive files by grouping the plurality of selected data files; and storing the archive files into the second storage section after having repeatedly performed the data file selection and the archive file creation M (M is a natural number) times.

Since the data files to be copied are grouped into archives before the data files are copied under the data backup method according to the present invention, the time required to copy the data files can be reduced. Hence, the present invention yields the advantage of being able to significantly improve the processing capability of a data backup device. Further, under this method, since distributed processing is used to cause the archive file creation section to create an archive file and to cause the backup processing section to copy the thus-created archive file, the processing operations can be performed speedily and accurately, thus increasing the processing rate of the data backup device.

According to still another aspect of the present invention, there is provided a computer-readable recording medium on which is recorded a data backup program for activating a computer in order to store the data files stored in a first storage section into a second storage section in a duplicated manner, the program comprising: a selection function of selecting from among the data files stored in the first storage section those data files that satisfy given conditions; an archive file creation function of creating N (N is a natural number) archive files by grouping the plurality of selected data files and repeating the archive file creation processing M (M is a natural number) times; and a backup processing function of storing the thus-created archive files into the second storage section.

Since, before being copied, the data files to be copied are grouped into archives by means of the computer-readable recording medium having a data backup program recorded thereon according to the present invention, the time required to copy the data files can be reduced. Hence, the present invention yields the advantage of being able to significantly improve the processing capability of a data backup device. Further, under this method, since distributed processing is used to cause the archive file creation section to create an archive file and to cause the backup processing section to copy the thus-created archive file, the processing operations can be performed speedily and accurately, thus increasing the processing rate of the data backup device.

BRIEF DESCRIPTION OF THE DRAWINGS

FIG. 2 is a table showing one example of a database created by the data backup device according to the embodiment;

DESCRIPTION OF THE PREFERRED EMBODIMENT (a) Description of Embodiment of the Present Invention With reference to the accompanying drawings, an embodiment of the present invention will be described.

Figure 1:
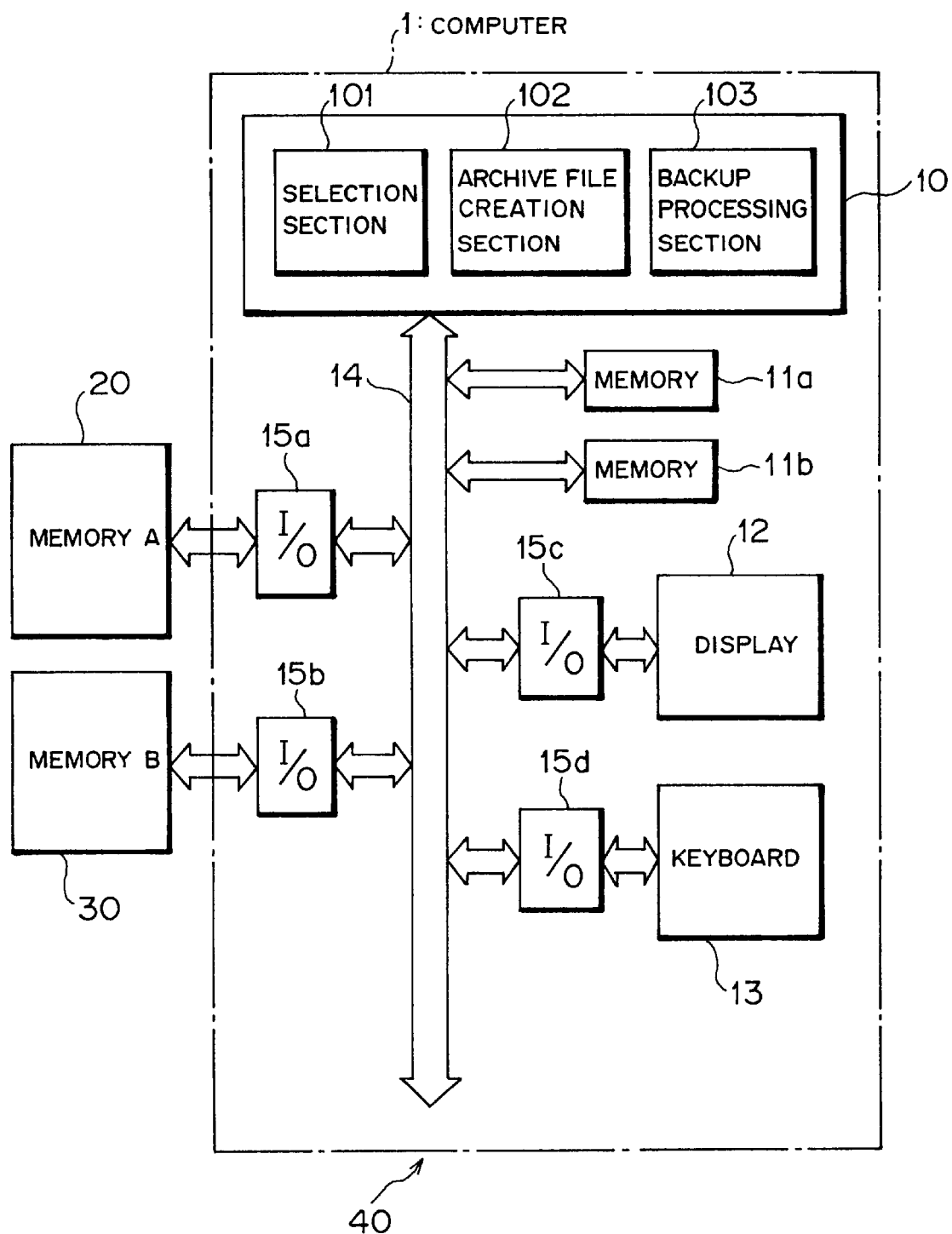
FIG. 1 is a block diagram showing the configuration of a data backup device for use with a computer according to an embodiment of the present invention.

FIG. 1 is a block diagram showing the configuration of a data backup device for use with a computer according to one embodiment of the present invention. A data backup device 40 for use with a computer shown in FIG. 1 comprises a computer 1, a first storage section (memory A) 20, and a second storage section (memory B) 30. Data files stored in the first storage section 20 are stored in the second storage section 30 in a duplicated manner. Memory devices A, B are configured in the form of external storage devices such as hard disks.

More specifically, the computer 1 comprises a CPU (Central Processing Unit) 10, memory devices 11a, 11b, a display 12, and a keyboard 13. The memory devices 11a, 11b are connected to the CPU 10 by way of a bus 14, whereas the display 12 and the keyboard 13 are connected to the CPU 10 by way of the bus 14 and the input-output interfaces (I/O)

15c, 15d. The first storage section 20 and the second storage section 30 are connected to the CPU 10 by way of the bus 14 and input-output interfaces (I/O) 15a, 15b.

The CPU 10 controls individual sections provided in the computer 1 and the first and second storage sections 20, 30 provided outside the computer 1. To this end, as shown in FIG. 1, the CPU 10 is configured to comprise a selection section 101, an archive file creation section 102, and a backup processing section 103. The CPU 10 operates according to a backup program recorded in the memory device 11a, which will be described later. The foregoing sections will be individually described in detail later.

The memory device 11a stores a backup program for implementing the respective functions of the selection section 101, the archive file creation section 102, and the backup processing section 103 and employs, e.g., RAM or ROM. In short, according to the backup program stored in the memory device 11a, the CPU 10 is activated to implement various functions of the backup device according to the present embodiment.

The backup program is stored in the memory device 11a by installation of the backup program recorded on a recording medium such as a floppy disk.

The memory device 11b is a working memory device used for arithmetic operations of the computer 1b and employs, e.g., RAM. Further, the display 12 is an image display means for displaying data to be computed by the computer 1 and the result of computation of the data performed by the computer 1. The keyboard 13 is a means for entering keys used for arithmetic operations of the computer 1.

The selection section 101 of the CPU 10 selects from the data files stored in the first storage section 20 those data files that satisfy given conditions. More specifically, the selection section 101 retrieves data sets, such as the name of a data file, the date on which a data file was created, and the size of data, from all the data files stored in the area of the first storage section 20 to be copied. From the thus-retrieved data sets, the selection section 101 selects data files that satisfy given conditions.

The selection section 101 classifies the thus-selected data files according to specifiable information (e.g., the name of a data file), thereby creating a database such as that shown in FIG. 2.

As mentioned previously, the selection section 101 can select all the data files to be grouped, and the archive file creation section 102, which will be described later, can group all the thus-selected data files into an archive file. Accordingly, there can be minimized the number of times the data file is opened and closed when the backup processing section 103, which will be described later, performs a backup operation.

More specifically, since the number of times the data file is opened and closed is proportional to the number of data files to be copied, the number of times a data filed is opened and closed can be reduced by reduction of the number of data files.

The operating system (OS) of the computer 1 can define the foregoing area to be copied in partitions logically formed in the first storage section 20 or in directories of a file system having a hierarchical structure.

The selection section 101 is designed to select data files of smaller than a given size. More specifically, the backup processing rate is decreased primarily for reasons of handling a plurality of small data files. If data files of smaller than a given size are grouped together, the processing time can be reduced. Further, since the size of an archive file can be limited, the storage capacity of the first storage section 20 can be reduced.

The selection section 101 is designed so as to select only those data files that has been modified or newly created since the archive file creation section 102 performed the m$-1^{th}$ operation when the archive file creation section 102, which will be described later, is performing the m$^{th}$ operation (m is a natural number satisfying m≦M).

Since the selection section 101 selects only the new data file that has been processed during the preceding operation cycle of the archive file creation section 102, the number of data files to be grouped can be reduced. Further, the number of archive files can also be reduced. This processing corresponds to the incremental backup processing mentioned previously.

The selection section 101 is designed to select only those data files that have been modified or newly created since the archive file creation section 102 performed the first operation when the archive file creation section 102 is performing the m$^{th}$ operation (m≦M).

If the size (capacity) of the archive file or the number of archive files has been increased as a result of the archive file creation section 102 to be described later grouping the data files several times, the data files can be grouped again by extracting only those data files that have been modified or newly created since the archive file creation section 102 performed the first operation. Accordingly, the number of data files to be grouped can be reduced. Even in this case, the number of archive files can be reduced. The foregoing processing corresponds to the differential backup processing mentioned previously.

The archive file creation section 102 shown in FIG. 1 creates N archive files (N is a natural number) by grouping the plurality of data files selected by the selection section 101 and repeats the archive file creation processing M times (M is a natural number). The expression "archive file" used herein refers to a file into which a plurality of data files are grouped.

First, the archive file creation section 102 opens the data files contained in the list of a database created in the selection section 101 and reads the contents from the data files. The archive file creation section 102 then groups the thus-read data files into one archive file.

The number N (N is a natural number) of archive files can be determined on the basis of the predetermined size or number of archive files or on the basis of the number of directories in the area to be copied.

After having grouped the data files into the archive file, the archive file creation section 102 creates an archive file database which includes the names of data files and the dates on which the data files were created. The thus-created archive file database is stored in the first storage section 20 together with the archive file. At this time, the thus-created archive file database may be included so as to constitute a part of the archive file or stored as another data file.

All the data files included in the initially-created database (i.e., the database described with reference to FIG. 2) are to be subjected to the foregoing processing. As shown in FIG. 2, the thus-processed data files are recorded as having been processed (e.g., the data files are assigned an "already-grouped" sign).

As mentioned previously, as a result of grouping the plurality of data files to be copied into one file before the files are copied, the number of files to be copied to the second storage section 30 can be significantly reduced. Further, the number of times the data files are opened or closed at the time of backup processing can be reduced.

In short, it becomes possible to realize backup processing having the advantage of the disk image backup method; that is, the advantage of being able to reduce the processing time, as well as the advantage of the file image backup method; that is, the advantage of being able to copy or restore a data file on a file-by-file basis.

Further, the archive file creation section 102 is designed to repeatedly perform a round of foregoing grouping operations M times. The number (M) of times the grouping operation is repeated is determined on the basis of the predetermined time interval between the grouping operations and the number of times of the processing therefor.

More specifically, since the archive file creation section 102 does not copy the data files grouped one time to the second storage section 30 but groups the data files M times, optimum information can be efficiently copied to the storage section.

In other words, the newest pieces of information relating to the data files to be copied are grouped under given conditions (e.g., the time interval between grouping operations or the number of times the grouping operation is performed). Therefore, the load (i.e., the number of data files to be processed) required by the archive file creation section to group the data files one time can be reduced, and the load can be dispersed among the individual sections of the computer.

Even in a case where a correction, such as addition or deletion of a data set occurred during a short period of time, is made to a data file, only the archive file including the data set is extracted from the N archive files grouped M times and can be amended.

The foregoing archive file creation section 102 is designed to create an archive file and compresses the thus-created archive file. In general, as the size of a data file to be compressed becomes larger, a compression ratio at which the data file is compressed becomes greater. For this reason, a higher compression ratio is liable to be achieved by compressing the individual data files than archive files.

The foregoing archive file creation section 102 creates an archive file after having compressed each of data files. As a result, when a data file is added to the archive file, the data file can be added to the archive file without the need of decoding the archive file.

The foregoing archive file creation section 102 is designed to add the data file selected by the selection section 101 during the $m^{th}$ (where $m \leq M$) operation of the archive file creation section 102 to the archive file created during the $M-1^{th}$ operation of the same.

More specifically, as mentioned previously, the archive file creation section 102 is designed to create an archive file and to store the thus-created archive file in the first storage section 20 together with the archive file database. In this example, the archive file creation section 102 is designed to perform the creation of an archive file M times without use of means for storing data to the first storage section 20.

In short, a data file which is newly created when the data files are grouped by the $m^{th}$ operation of the archive file creation section 102 is added to the archive file created by the $m-1^{th}$ operation of the same. At this time, information about the newly updated $m^{th}$ data file is added to the archive data base.

When the $m^{th}$ data file is added to the archive database, a decision is made through retrieval as to whether or not there is an information item relating to a data file corresponding to the $m^{th}$ data file is stored in the $m-1^{th}$ data file. If the information item is stored in the $m-1^{th}$ archive file data base, a marking (or a check mark, e.g., "OLD") which represents that the thus-retrieved information item is an existing data file corresponding to the $m^{th}$ data file is assigned to the information item. When a new data file is added to the archive file database, the data file may be added not only to the tail end of the database but also to the leading end of the database.

The foregoing archive file creation section 102 is arranged to delete from the archive file a past data file corresponding to the data file selected by the selection section 101 during the $m^{th}$ ($m \leq M$) operation and to add the thus-selected data file to the archive file created during the $m-1^{th}$ operation of the archive file creation section 102. Even in this case, as mentioned previously, the archive file creation section 102 performs the creation of an archive file M times without use of the means for storing data to the first storage section 20.

More specifically, when a data file newly updated during the $m^{th}$ grouping operation of the archive file creation section 102 is added to the archive file created during the $m-1^{th}$ grouping operation of the same, the data file—which is stored in the archive file created during the $m-1^{th}$ grouping operation and corresponds to the data file to be updated—is deleted to thereby reduce the size of the archive file. When the data file is added to the archive file, the data file may be added to the leading end of the archive file in the manner analogous to that mentioned previously.

Next, the backup processing section 103 shown in FIG. 1 stores the archive file created by the archive file creation section 102 into the second storage section 30. More specifically, the backup processing section 103 is designed to respectively store (i.e., copy) the data files failed to satisfy given conditions and the archive file. The data files grouped into the first storage section 20 may be deleted after having been stored in the second storage section 30.

The backup processing section 103 compresses respectively the data files failed to satisfy given conditions and the archive files and store the thus-compressed files into the second storage section 30.

Specifically, in the processing stage, which precedes a copying stage and in which the creation of an archive file is repeated M times, the backup processing section 103 does not compress the archive files and the data files failed to satisfy given conditions. In contras, when copying the files to the second storage section 30, the backup processing section 103 compresses the files, whereby the load which is exerted on the backup processing section 103 when the backup processing section 103 compresses files can be reduced during the repeated creation of an archive file.

Further, the foregoing backup processing section 103 is designed to add to the archive another archive file or those data files that have failed to satisfy given conditions and to store the archive file into the second storage section 30. More specifically, addition to one of the previously-created archive files the data file that has failed to satisfy given conditions enables a reduction in the number of data files to be copied to the second storage section 30.

Although the backup processing section 103 is designed to add to any one of the N archive files the data file that has failed to satisfy given conditions, the backup processing section 103 is not limited to such an operation but may create a new archive file by grouping only those data files that have failed to satisfy given conditions. In other words, the number of archive files is not limited to N.

Further, the second storage section 30 may add to the archive file those data files that have failed to satisfy given conditions after the data files and the archive file have been respectively copied to the second storage section 30.

The backup processing section 103 is designed to copy to the second storage section 30 the data files that have failed to satisfy given conditions and the archive files after having grouped these files into another archive file. In short, the archive files that have been collected in groups easily available for the user, such as a directory, can be further grouped together so as to be distinguished from other data files.

Although the backup processing section 103 is designed to group into another archive file the archive files and those data files that have failed to satisfy given conditions, the backup processing section 103 may create another new archive file by further grouping a plurality of only archive files.

In this case, the number of archive files is not limited to N, namely, the archive files can be collected into groups easily available for the user, such as a directory, and the number of data files to be copied to the second storage section 30 can also be reduced.

The backup processing section 103 is designed to cause the archive file creation section 102 to again create archive files one time immediately before respectively storing those data files that have failed to satisfy given condition and the archive files into the second storage section 30.

During the interval from when the archive file creation section 102 has performed grouping operations M times to when the backup processing section 103 copies data to the second storage section, the backup processing section 103 can copy all those data files that have been newly created or modified without fail.

As mentioned previously, since the data backup device 40 uses distributed processing to cause the foregoing archive file creation section 102 to create an archive file and to cause the backup processing section 103 to copy the thus-created archive file, the processing operations can be performed speedily and accurately.

Figure 3:
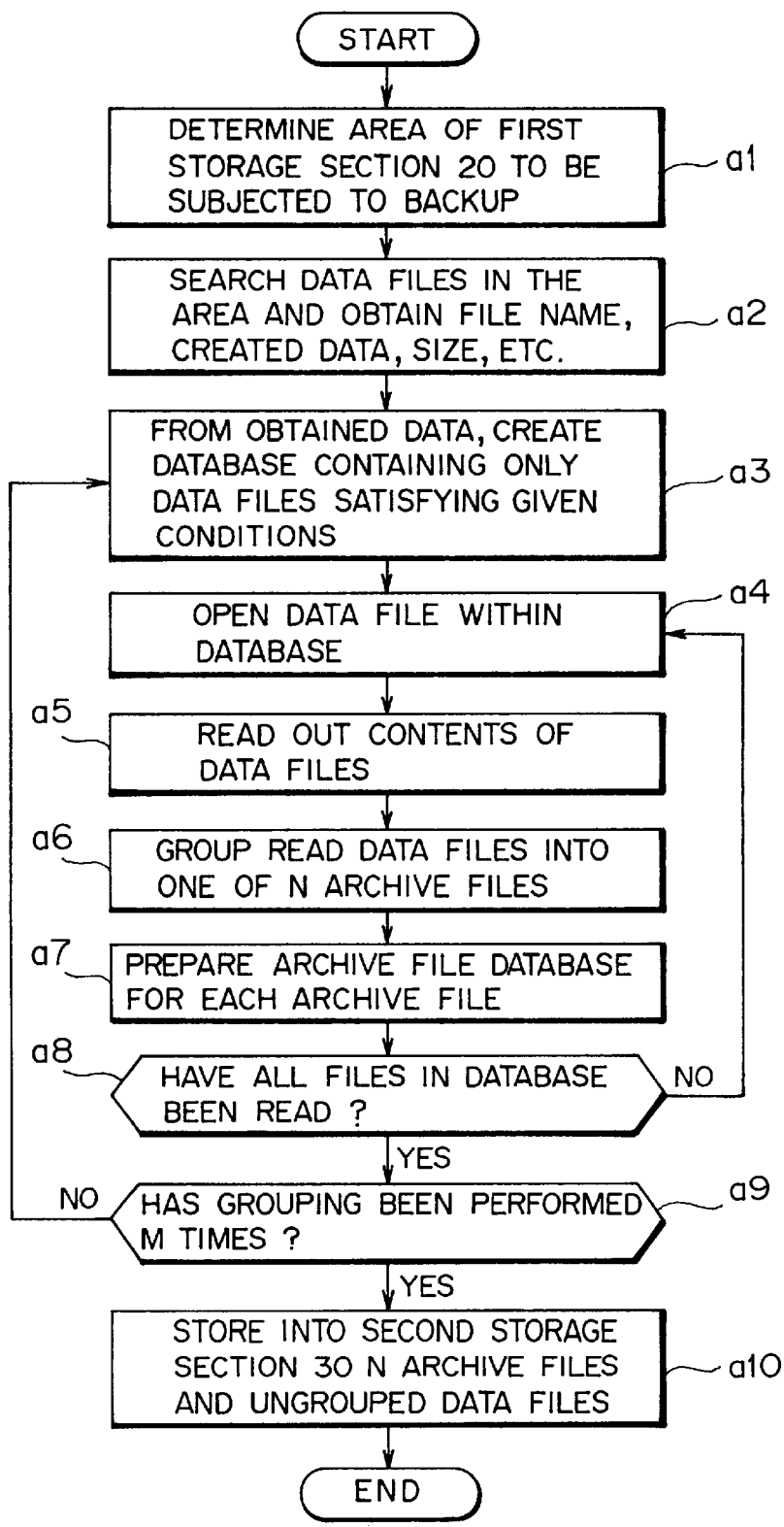
FIG. 3 is a flowchart for explaining the operation of the data backup device according to the embodiment.
Figure 4:
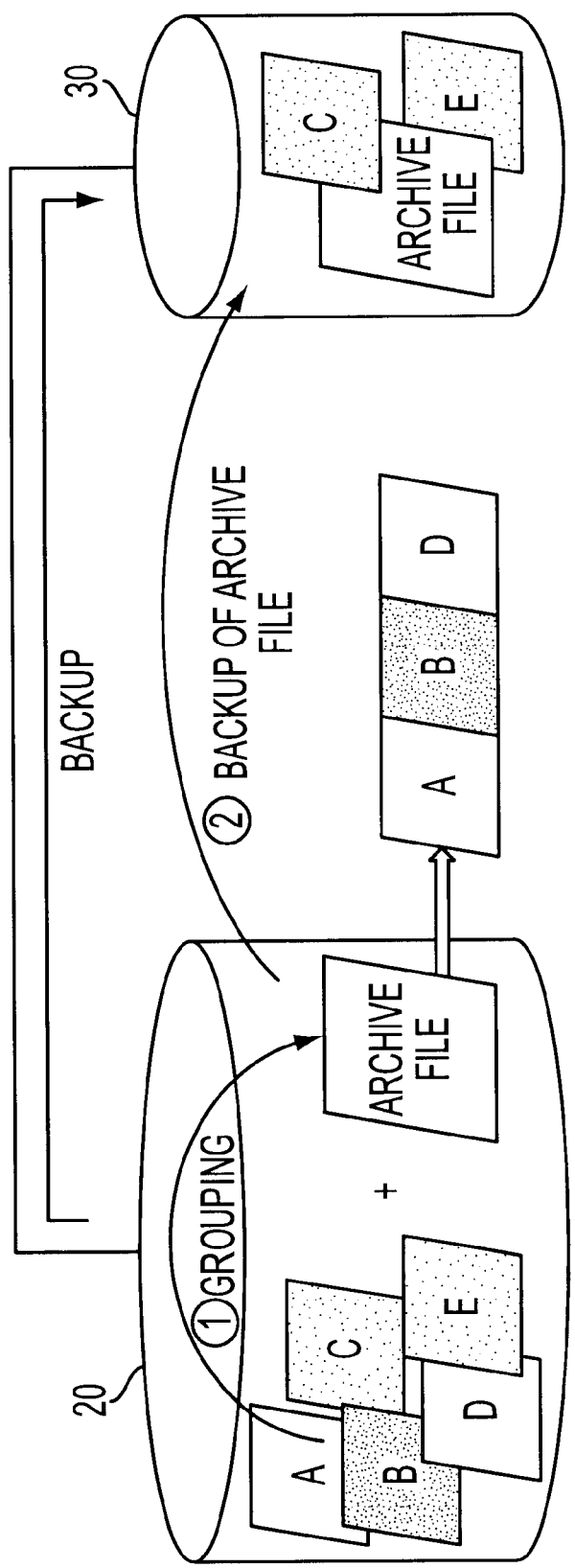
FIG. 4 is a schematic representation for explaining the operation of the data backup device according to the embodiment.

With reference to FIGS. 3 and 4, an explanation will be given of the operation of the data backup device 40 for use with a computer according to one embodiment of the present invention having the foregoing configuration.

First, the selection section 101 of the computer 1 shown in FIG. 1 determines an area to be copied among the data sets stored in the first storage section 20 (step a1 show in FIG. 3). Pieces of information relating to the names of files, the dates on which the files were created, and the size of the files are fetched through retrieval of data files stored in the thus-determined area (step a2 shown in FIG. 3).

Subsequently, data files that satisfy given conditions are selected from among the thus-retrieved data files, and there is created a database relating to those data files that satisfy given conditions such as those shown in FIG. 2 (step a3 shown in FIG. 3).

The archive file creation section 102 opens data files included in the list of data base created by the selection section 101 (step a4 shown in FIG. 3) and reads the contents of those data files (step a5 shown in FIG. 3). The selected data files may be opened in order or at one time.

Subsequently, the thus-read data files are grouped into one of N archive files (step a6 shown in FIG. 3 and step ① shown in FIG. 4). In the case of an example shown in FIG. 4, data files A, B, and D are grouped into one archive file.

The archive file creation section 102 creates an archive file database including the names of the thus-grouped data files and the dates on which the data files were created (step a7 shown in FIG. 3), storing the thus-created database to the first storage section 20 together with the archive file.

A decision is made as to whether or not all those data files that are included in the database created by the selection section 101 have been read (step a8 shown in FIG. 3). If those data files have not yet been read (NO in step a8 shown in FIG. 3), the data files that are included in the database created by the selection section 101 are again opened (step a4 shown in FIG. 3). Processing analogous to that mentioned previously will be carried out hereafter.

In contrast, if all those data files included in the database created by the selection section 101 have already been read (YES in step a8 shown in FIG. 3), a decision is made as to whether or not grouping operations have already been repeatedly performed M times (step a9 shown in FIG. 3).

If it is decided in step a9 that the grouping operations have not yet been repeatedly performed M times (NO in step a9 shown in FIG. 3), the selection section 101 creates once again a database relating to only those data files that satisfy given conditions (step a3 shown in FIG. 3).

In contrast, if the grouping operations have already been repeatedly performed (YES in step a9 shown in FIG. 3), grouped N archive files and those data files that have failed to satisfy given condition are respectively copied to the second storage section 30 (step a10 shown in FIG. 3, and step ② shown in FIG. 4). In the case of the example shown in FIG. 4, one archive file and data files C and E are respectively copied to the second storage section 30.

The operations of the archive file creation section 102 and the backup processing section 103 in the foregoing data backup device 40 will be described in detail.

(b) Creation of an Archive File in the Archive File Creation Section 102

Figure 5:
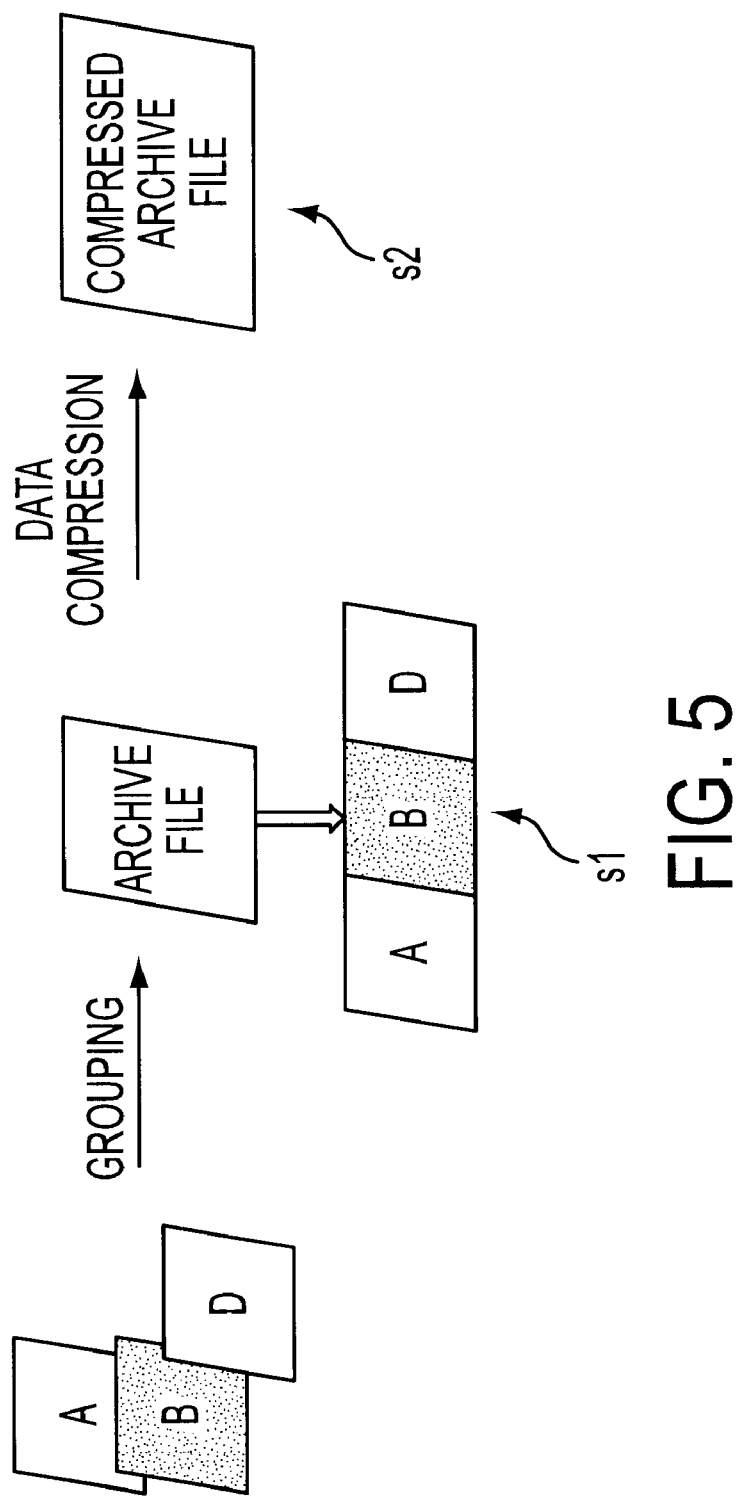
FIG. 5 is a schematic representation for explaining an archive file creation operation performed by an archive file creation section according to the embodiment.

(b1) Where an archive file is created and compressed:

With reference to FIG. 5, an explanation will be given of the case where the archive file creation section 102 creates an archive file by grouping data files and compresses the thus-created archive file.

First, the archive file creation section 102 creates one archive file by grouping those data files that satisfy given conditions (e.g., data files A, B, and D) (step s1 shown in FIG. 5) and compresses the thus-created archive file (step s2 shown in FIG. 5).

As mentioned previously, the foregoing data backup device 40 is capable of reducing the size (or amount of data) of the archive file, thus yielding the advantage of being able to reduce the storage capacity of the first storage section 20 that creates an archive file, as well as of the second storage section 30 that stores the archive files and the data files.

(b2) Where an archive file is created by compression of data files to be copied

Figure 6:
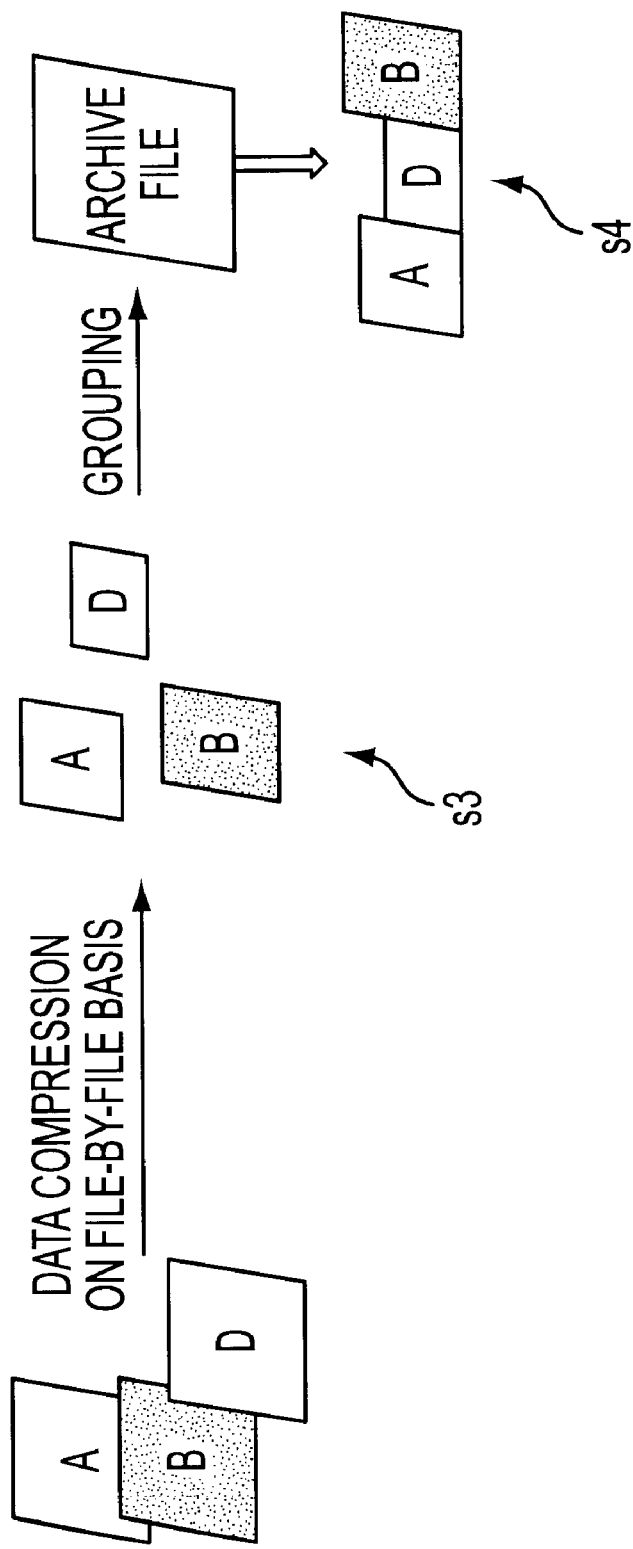
FIG. 6 is a schematic representation for explaining the archive file creation operation performed by the archive file creation section according to the embodiment.

With reference to FIG. 6, an explanation will be given of a case where the archive file creation section 102 creates an archive file after having compressed a plurality of data files.

First, the archive file creation section 102 compresses those data files that satisfy given conditions (e.g., data files A, B, and D) (step s3 shown in FIG. 6) and creates one archive file by grouping together the plurality of thus-compressed data files (step s4 shown in FIG. 6).

Accordingly, when data files are added to the archive file, data files can be added to the archive file without the need of decoding the archive file, thus enabling speedy creation of an archive file.

(b3) Where data files are added to the archive file that has been created in the preceding grouping operation With reference to FIGS. 7 and 8, an explanation will be given of a case where data files are added to the archive file that has been created by the preceding grouping operation.

Figure 7:
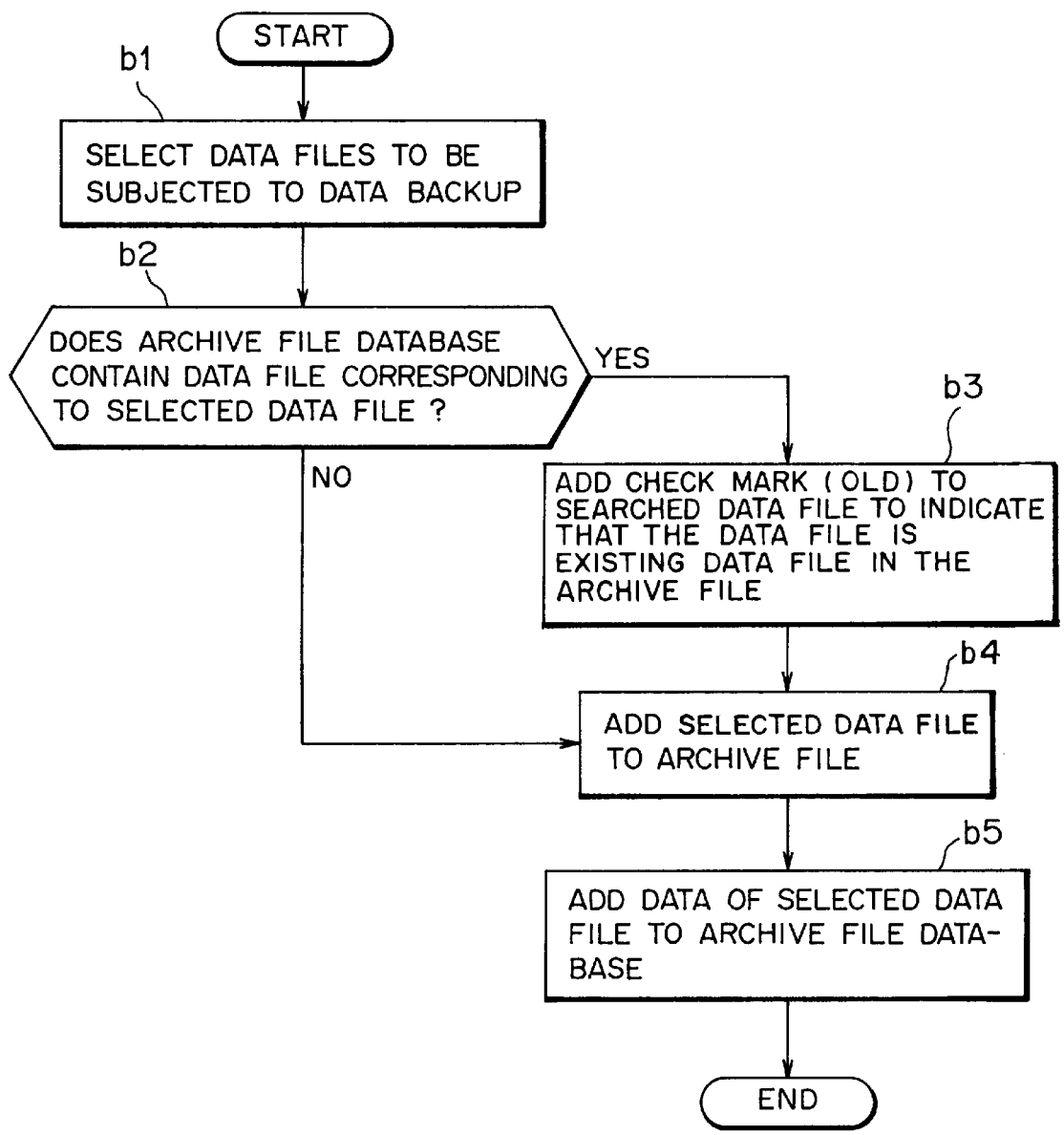
FIG. 7 is a flowchart for explaining the archive file creation operation performed by the archive file creation section according to the embodiment.
Figure 8:
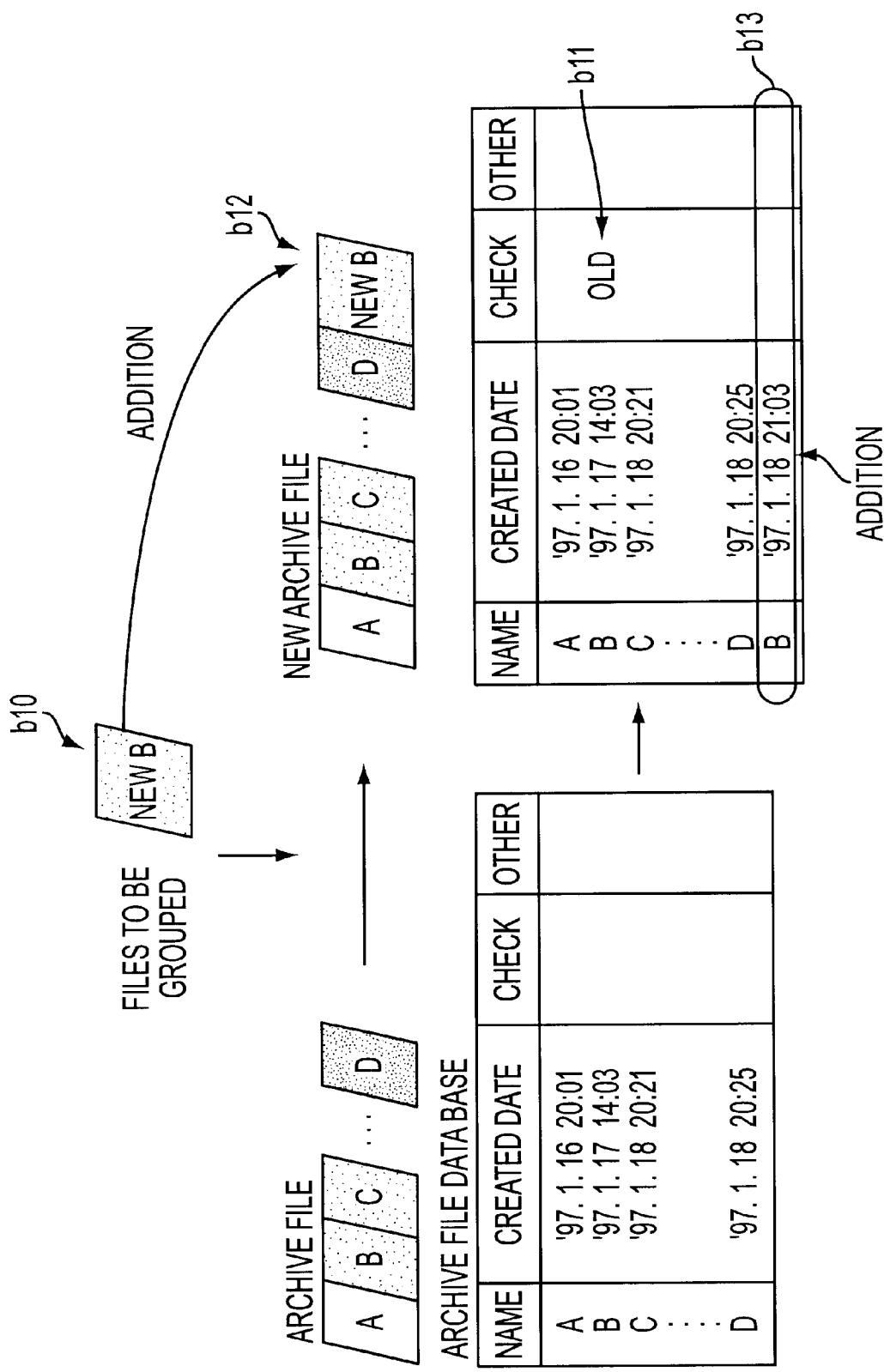
FIG. 8 is a schematic representation for explaining the archive file creation operation performed by the archive file creation section according to the embodiment.

First, when the archive file creation section 102 performs the $m^{th}$ grouping operation, the selection section 101 selects a data file to be copied (step b1 shown in FIG. 7, and step b10 shown in FIG. 8). In response to the selection of the data file, the archive file creation section 102 determines whether or not a data file corresponding to the data file selected during the $m^{th}$ grouping operation (i.e., a new data file B) is included in the database relating to the archive file created by the m–1$^{th}$ grouping operation (step b2 shown in FIG. 7).

If it is decided in step b2 that the corresponding data file is included in the database (YES in step b2 shown in FIG. 7), a marking (e.g., OLD) representing that this file is an existing data file is appended to the corresponding data file (step b3 shown in FIG. 7, and step b11 shown in FIG. 8). The data file selected during the $m^{th}$ grouping operation is added to the archive file created by the m–1$^{th}$ grouping operation (step b4 shown in FIG. 7, and step b12 shown in FIG. 12).

Subsequently, pieces of information relating to the thus-added $m^{th}$ data file (e.g., the name of the data file, the date on which the data file was created, or the size of the data file) are added to the database relating to the m–1$^{th}$ archive file (step b5 shown in FIG. 7, and step b13 shown in FIG. 8).

In contrast, if it is determined in step b2 shown in FIG. 7 that there is no corresponding data file (NO in step b2 shown in FIG. 7), the data file is added to the m–1$^{th}$ archive file, as is (step b4 shown in FIG. 7, and step b12 shown in FIG. 8). Information relating to the thus-added data file is added to the data base of the m–1$^{th}$ archive file (step b5 shown in FIG. 7, and step b13 shown in FIG. 8).

As mention ed previously, the foregoing data backup device 40 is configured to add the data file to be newly updated to the archive file that has been created by the preceding operation of the archive file creation section 102, yielding the advantage of being able to create an archive file through considerably simple processing such as simple addition of a data file to an archive file.

(b4) Where a data file is added to the archive file that has been produced by the preceding grouping operation after a corresponding data file has been deleted With reference to FIGS. 9 and 10, an explanation will be given of a case where a data file is added to the archive file that has been created by the preceding grouping operation after a corresponding file has been deleted.

Figure 9:
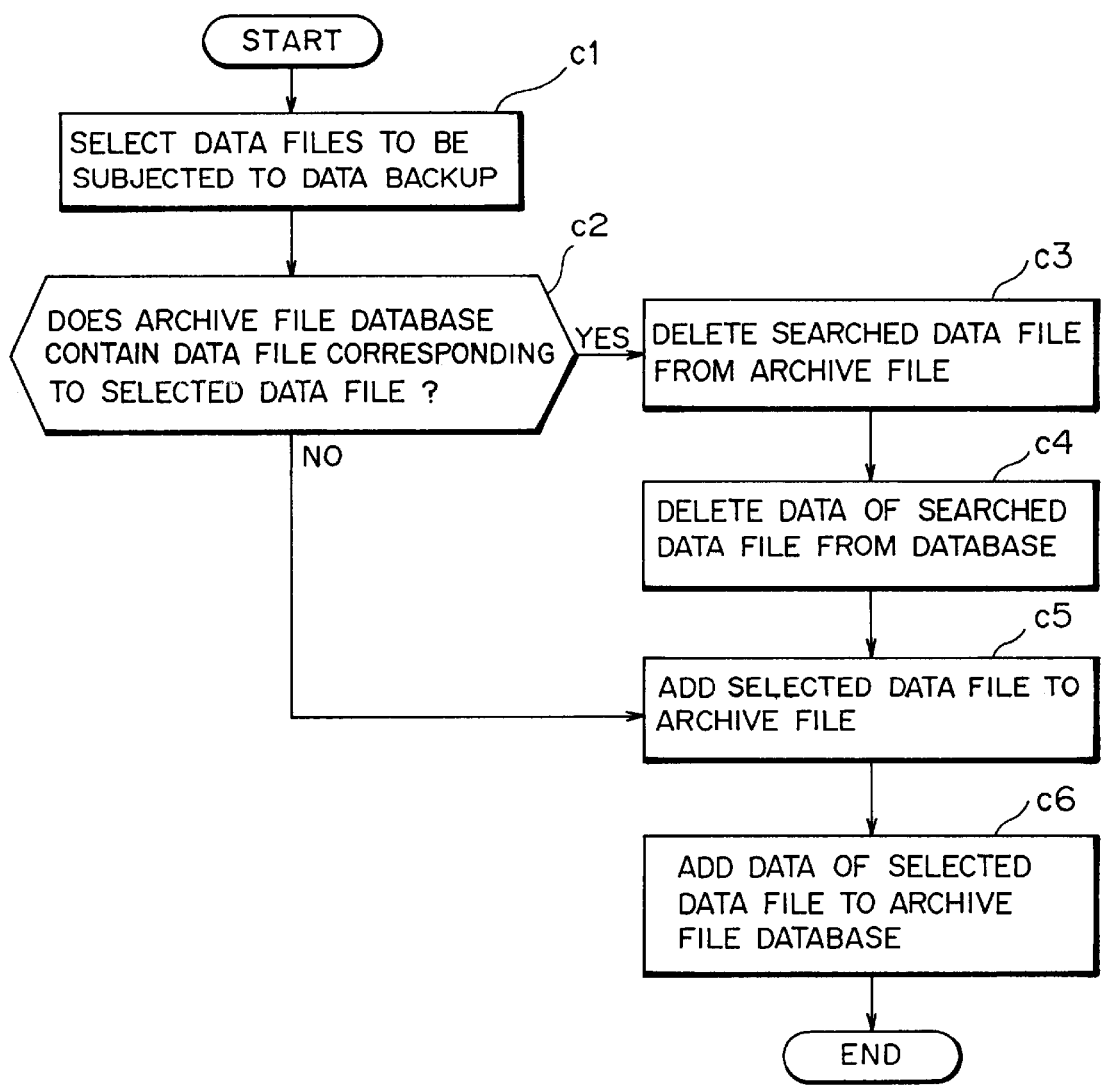
FIG. 9 is a flowchart for explaining the archive file creation operation performed by the archive file creation section according to the embodiment.
Figure 10:
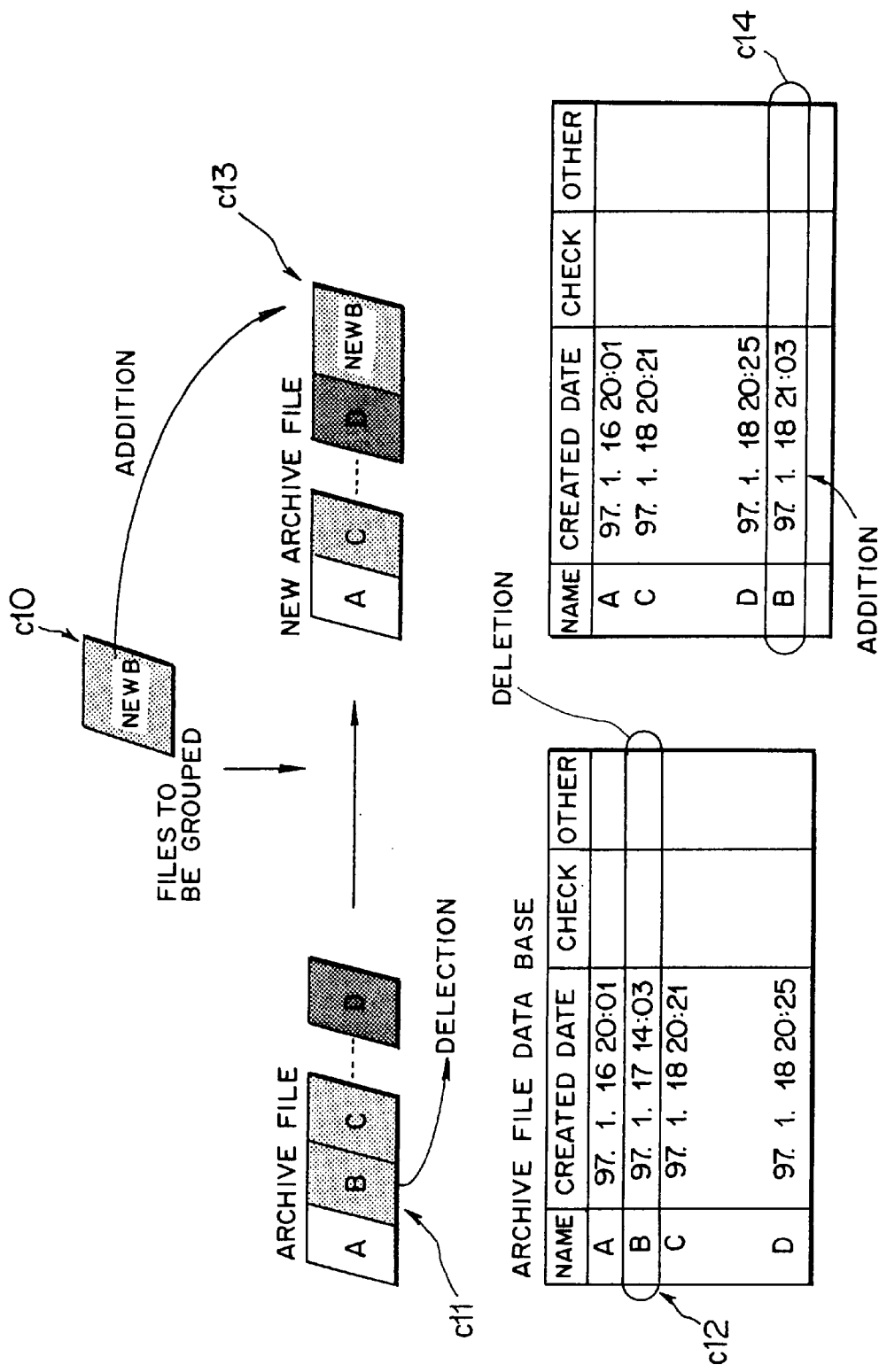
FIG. 10 is a schematic representation for explaining the archive file creation operation performed by the archive file creation section according to the embodiment.

With regard to the $m^{th}$ operation of the archive file creation section 102, the processing operations performed in steps c1, c2 shown in FIG. 9 and step c10 shown in FIG. 10 are analogous with those performed in previously-mentioned steps b1, b2 shown in FIG. 7 and step b10 shown in FIG. 8.

If a data file corresponding to the data file selected during the $m^{th}$ operation of the archive file creation section 102 is included in a database relating to the archive file created during the m–1$^{th}$ operation of the archive file creation section 102 (YES in step c2 shown in FIG. 9), this data file is deleted from the m–1$^{th}$ archive file (step c3 shown in FIG. 9, and step c11 shown in FIG. 10). Further, information relating to the data file corresponding to the thus-deleted data file is also removed (or deleted) from the data base relating to the thus-retrieved m–1$^{th}$ archive file (step c4 shown in FIG. 9, and step c12 shown in FIG. 10).

Subsequently, the thus-selected data file is added to the archive file (step c5 shown in FIG. 9, and step c13 shown in FIG. 10), and pieces of information relating to the thus-added $m^{th}$ data file (e.g., the name of the data file, the date on which the data file was created, or the size of the data file) are added to the database relating to the m–1$^{th}$ archive file (step c6 shown in FIG. 9, and step c14 shown in FIG. 10).

In contrast, if it is decided in step c2 shown in FIG. 9 that there is no corresponding data file (NO in step c2 shown in FIG. 9), the data file is added to the m–1$^{th}$ archive file, as is (step c5 shown in FIG. 9, and step c13 shown in FIG. 10). Information relating to the thus-added data file is added to the database relating to the m–1$^{th}$ archive file (step c6 shown in FIG. 9, and step c14 shown in FIG. 10).

As mentioned previously, the data backup device 40 is configured to delete a data file corresponding to a data file to be newly updated when the data file to be updated is added to the archive file that has been created in the preceding operation of the archive file creation section 102, thereby enabling a reduction in the amount of data of the archive file, as well as the copying of only the newest information to the second storage section 30.

(c) Backup Operation of the Backup Processing Section 103

Figure 11:
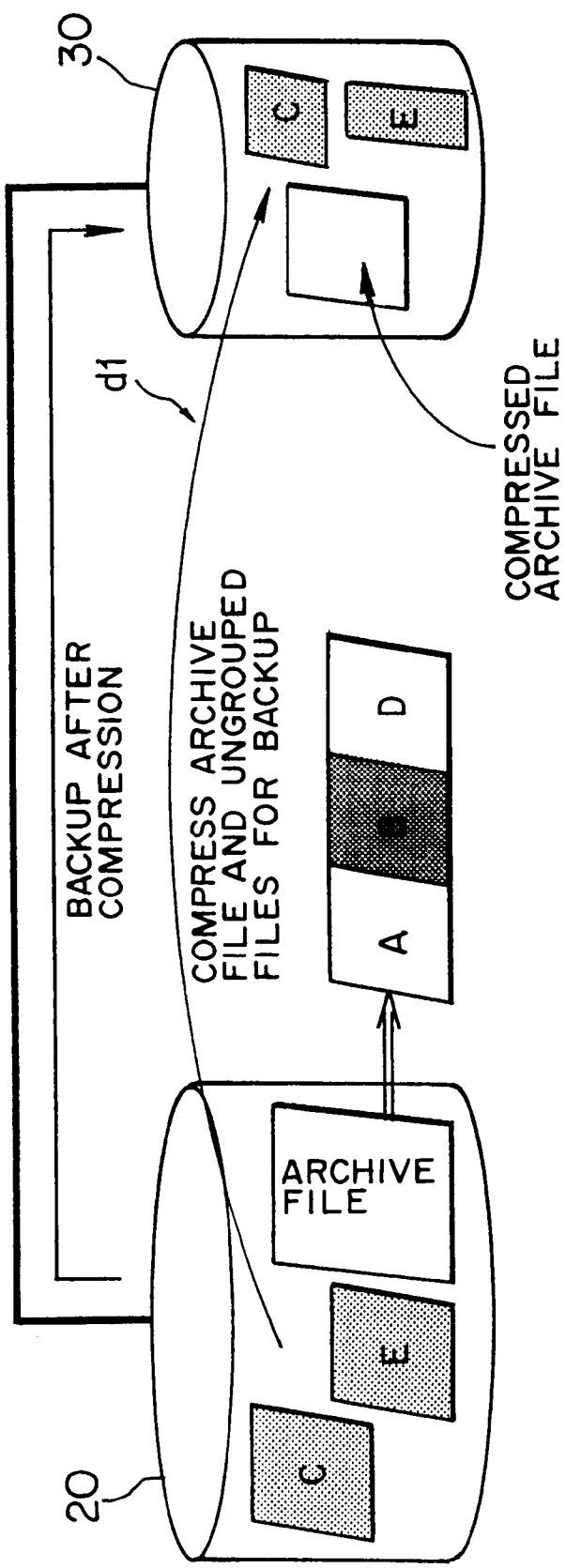
FIG. 11 is a schematic representation for explaining a backup operation performed by the backup processing section according to the embodiment.

(c1) Where those data files that have failed to satisfy given conditions and archive files are compressed In step a9 shown in FIG. 3, when the grouping operation has been repeatedly performed M times, the backup processing section 103 compresses those data files that have failed to satisfy given conditions and N archive files and stores the thus-compressed files into the second storage section 30 (step d1 shown in FIG. 11). In the case of an example shown in FIG. 11, one archive file comprising data files A, B, and D and data files C and D that have failed to satisfy given conditions are compressed and are copied to the second storage section 30.

As mentioned previously, the data backup device 40 compresses the archive file and those data files that have failed to satisfy given conditions when copying these files to the second storage section 30, thereby yielding the advantages of being able to reduce the load exerted on the data backup device when the creation of an archive file is repeatedly performed, as well as being able to reduce the storage capacity of the second storage section 30 to which the data files are copied.

(c2) Where those data files that have failed to satisfy given conditions are added to the archive file Although a detailed explanation has been given of the case where the data file to be copied is compressed when being copied, an explanation will be given of a case—where those data files that have failed to satisfy given conditions are copied after having been added to a created archive file—with reference to FIGS. 12 and 13.

Figure 12:
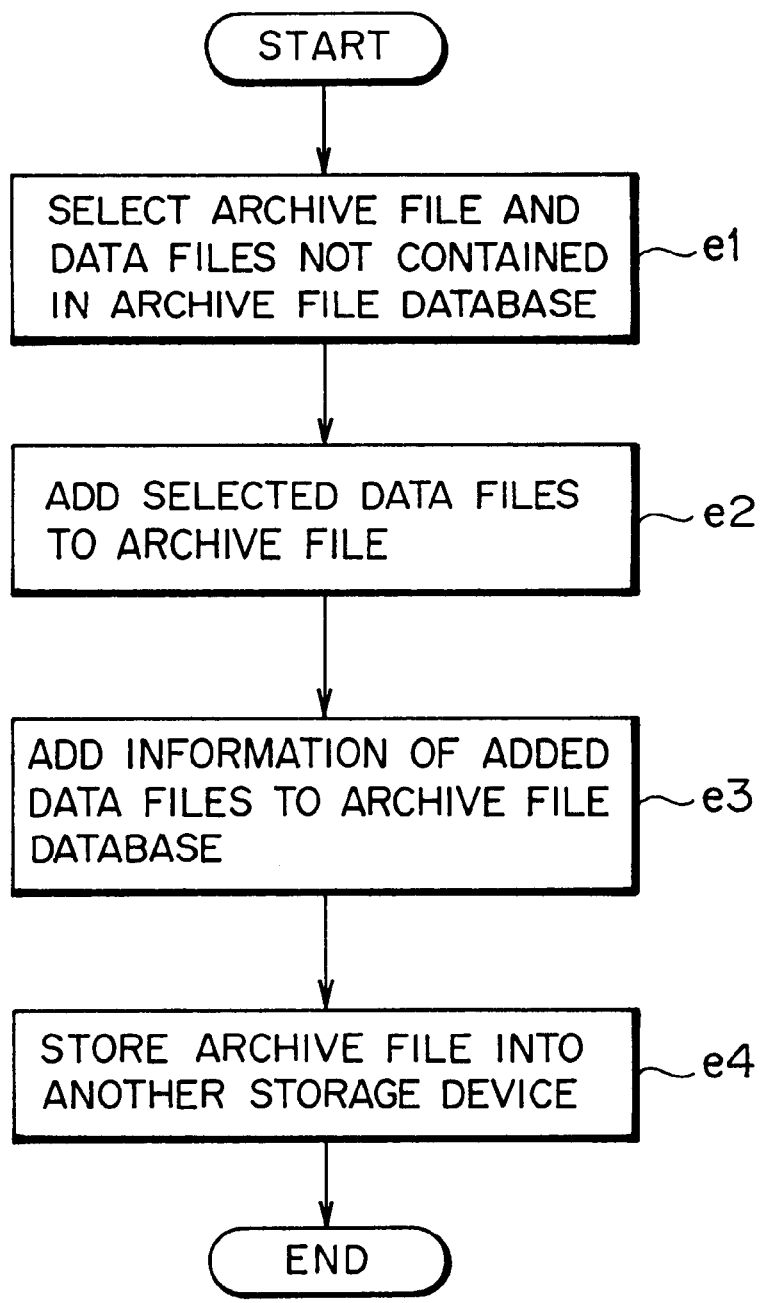
FIG. 12 is a flowchart for explaining the backup operation performed by the backup processing section according to the embodiment.
Figure 13:
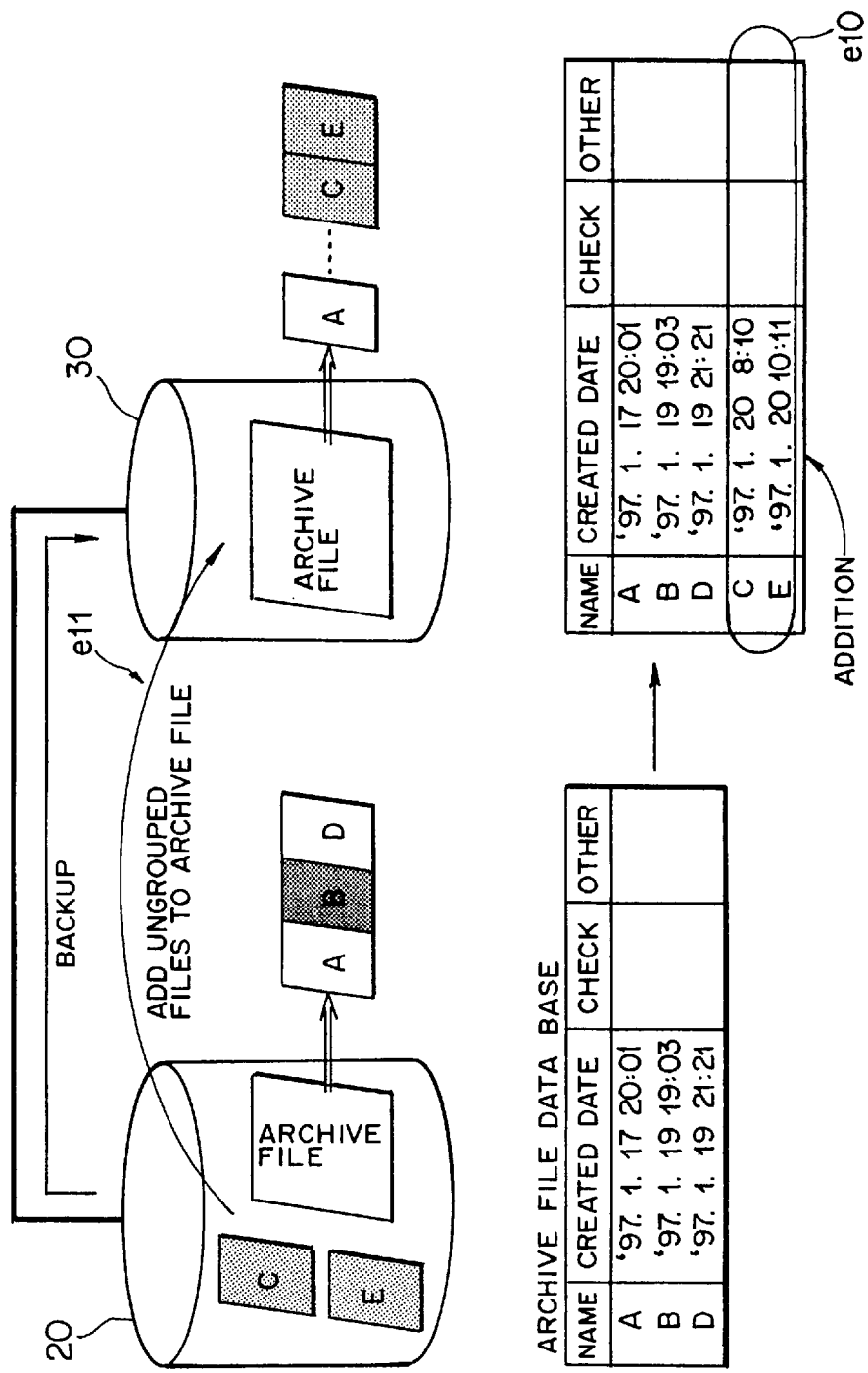
FIG. 13 is a schematic representation for explaining a backup operation performed by the backup processing section according to the embodiment.

First, the backup processing section 103 selects a created archive file and those data files that have failed to satisfy given conditions (step e1 shown in FIG. 12) and adds the thus-selected data files that have failed to satisfy given conditions to the archive file (step e2 shown in FIG. 12).

Subsequently, pieces of information relating to the added data files (e.g., the names of the data files, the dates on which the data files were created, or the size of the data file) are added to a database relating to the archive file (step e3 shown in FIG. 12, and step e10 shown in FIG. 13). The archive file is stored in the second storage section 30 (step e4 shown in FIG. 12, and step e11 shown in FIG. 13).

As mentioned previously, the data backup device 40 adds to the archive file those data files that have failed to satisfy given conditions and copies the data files, thereby enabling a reduction in the number of files to be copied and an improvement in the copying capability of the data backup device.

(c3) Where another archive file is created by grouping an archive file and those data files that have failed to satisfy given conditions Although the explanation has described in detail the case where those data files that have failed to satisfy given conditions are added to N archive files and where the files are copied under the foregoing method, an explanation will be given of a case—where N archive files and those data files that have failed to satisfy given conditions are copied after a new archive file has been formed from these files—with reference to FIGS. 14 and 15.

Figure 14:
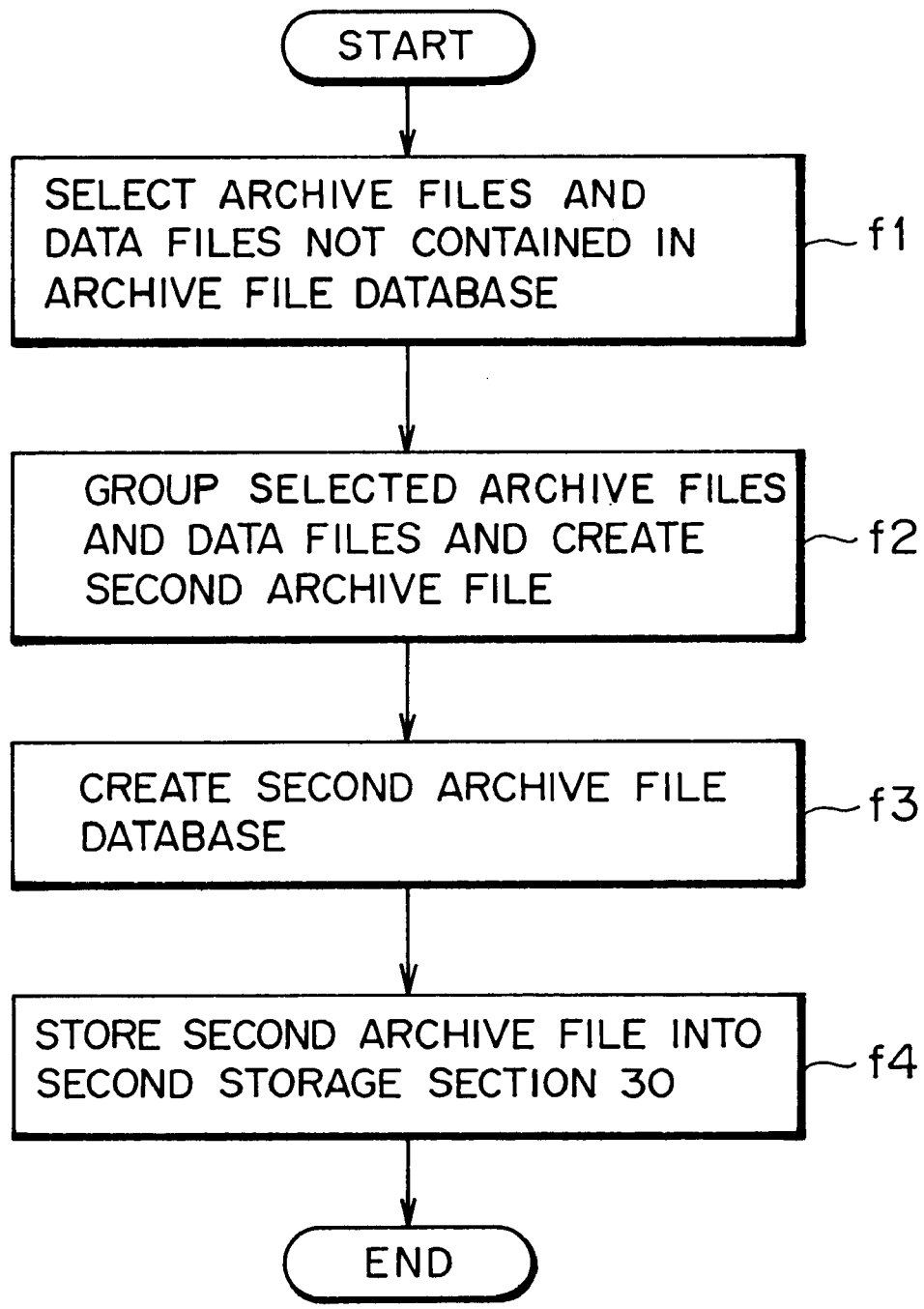
FIG. 14 is a flowchart for explaining the backup operation performed by the backup processing section according to the embodiment.
Figure 15:
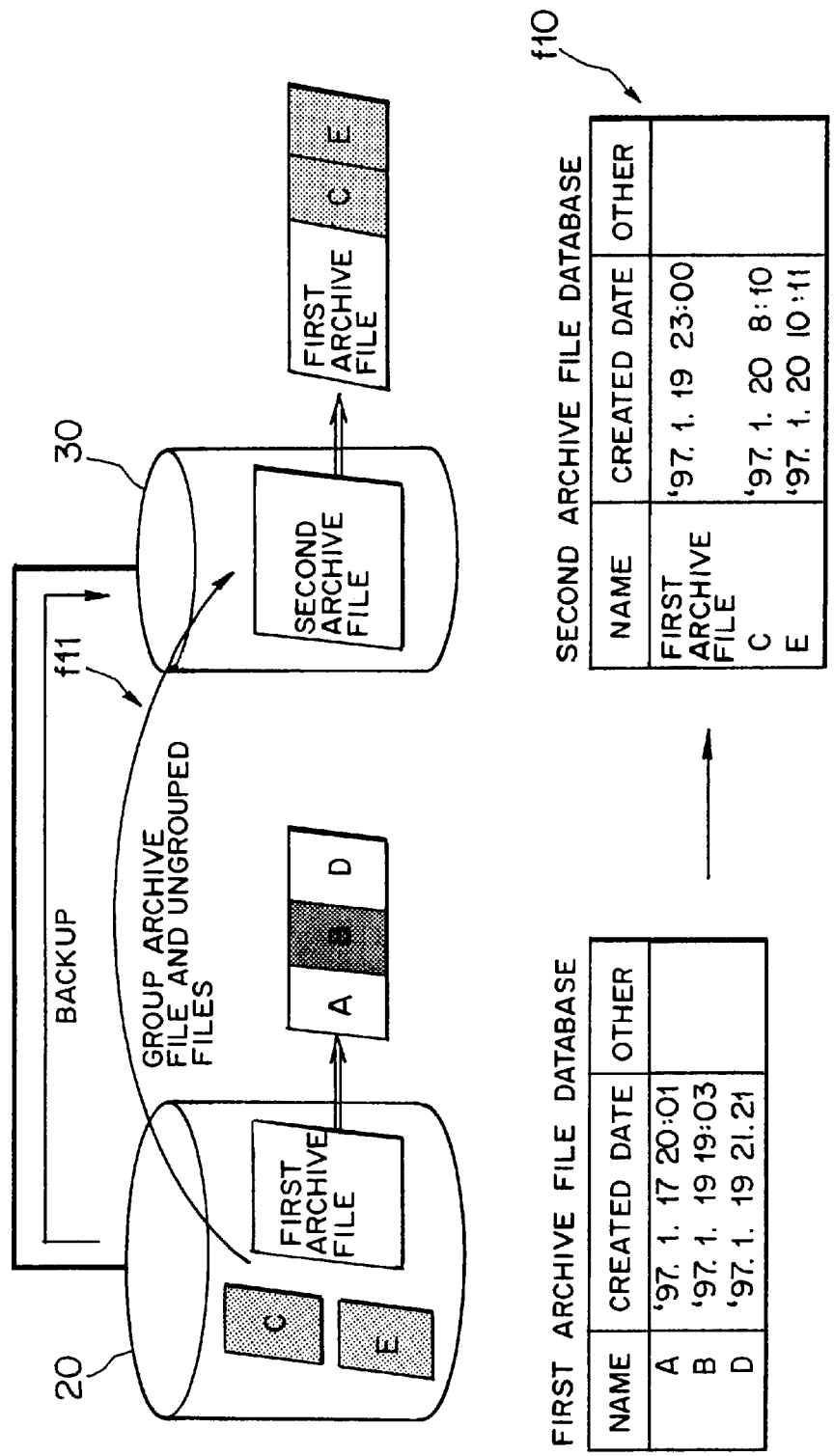
FIG. 15 is a schematic representation for explaining a backup operation performed by the backup processing section according to the embodiment.

First, an archive file (handled as e.g., a first archive file) and those data files that have failed to satisfy given conditions are selected (step f1 shown in FIG. 14), and a new archive file (handled as e.g., a second archive file) is formed by grouping the thus-selected first archive file and those data files that have failed to satisfy certain conditions (step f2 shown in FIG. 14).

Subsequently, a database relating to the second archive file is formed from pieces of information relating to the first archive file (e.g., the name of the archive file, the date on which the file was created, or the size of the file) and information relating to those data files that have failed to satisfy given conditions (step f3 shown in FIG. 14, and step f10 shown in FIG. 15). The thus-newly-created second archive file is stored in the second storage section 30 (step f4 shown in FIG. 14, and step f11 shown in FIG. 15).

As mentioned previously, the data backup device 40 copies the archive file and those data files that have failed to satisfy given conditions after having grouped these files into another archive file, thus yielding the advantage of being able to extract data in groups easily available for the user.

(c4) Where a grouping operation is again performed immediately before data files are copied With reference to FIGS. 16 and 17, an explanation will be given of a case where the archive file creation section 102 groups data files once again immediately before the data files are copied after the archive file creation section 102 has repeatedly performed the grouping of data files M times.

Figure 16:
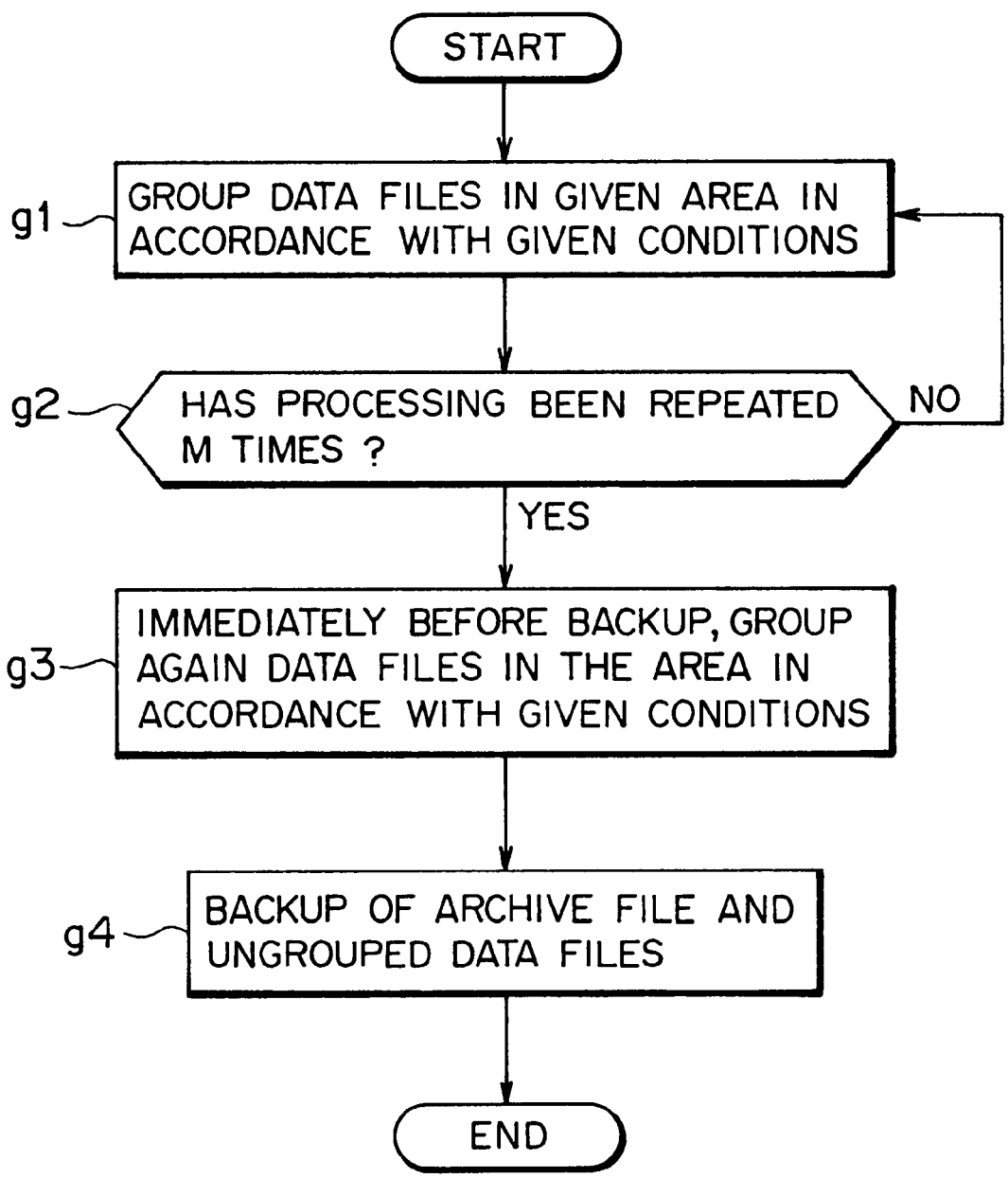
FIG. 16 is a flowchart for explaining the backup operation performed by the backup processing section according to the embodiment.
Figure 17:
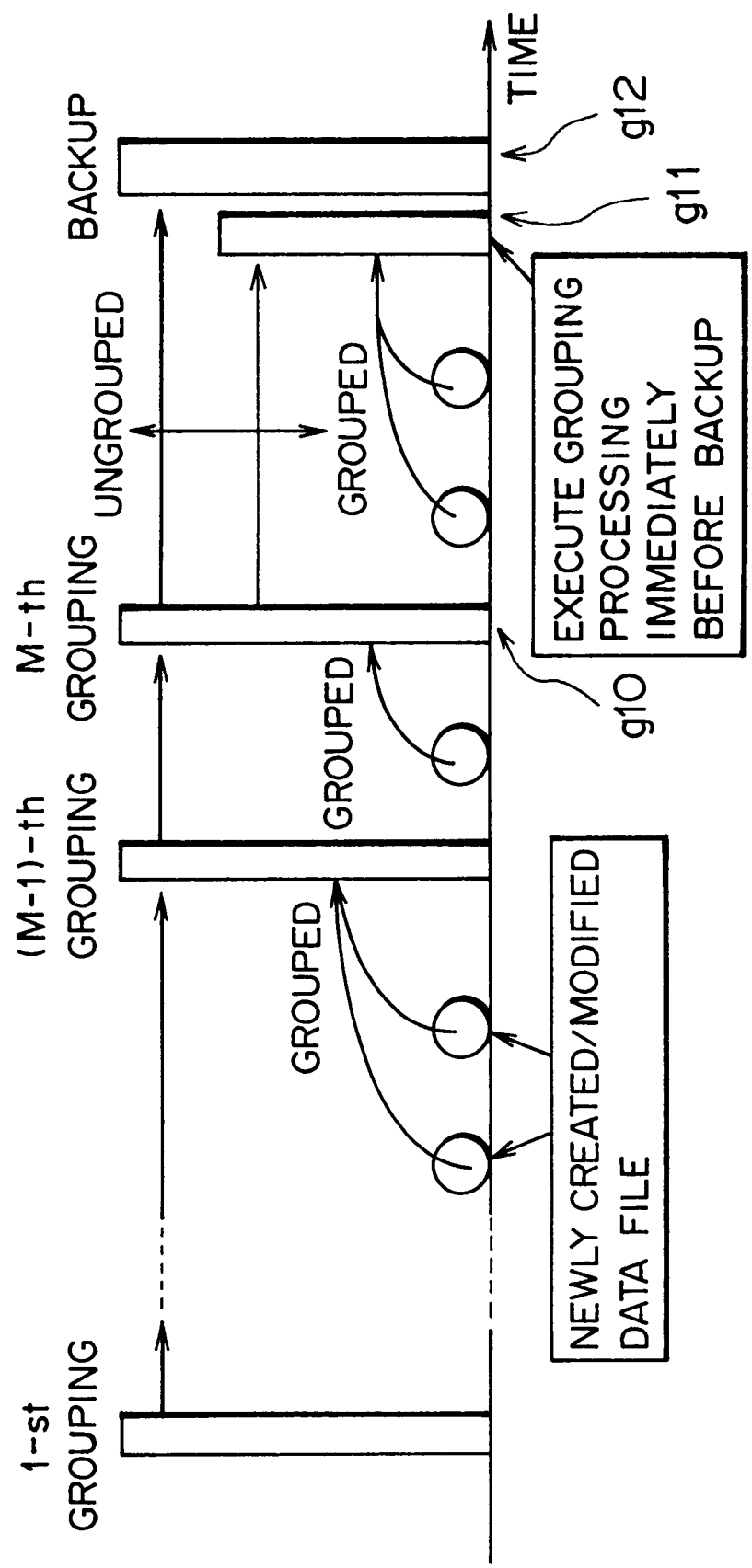
FIG. 17 is a schematic representation for explaining a backup operation performed by the backup processing section according to the embodiment.
Figure 18:
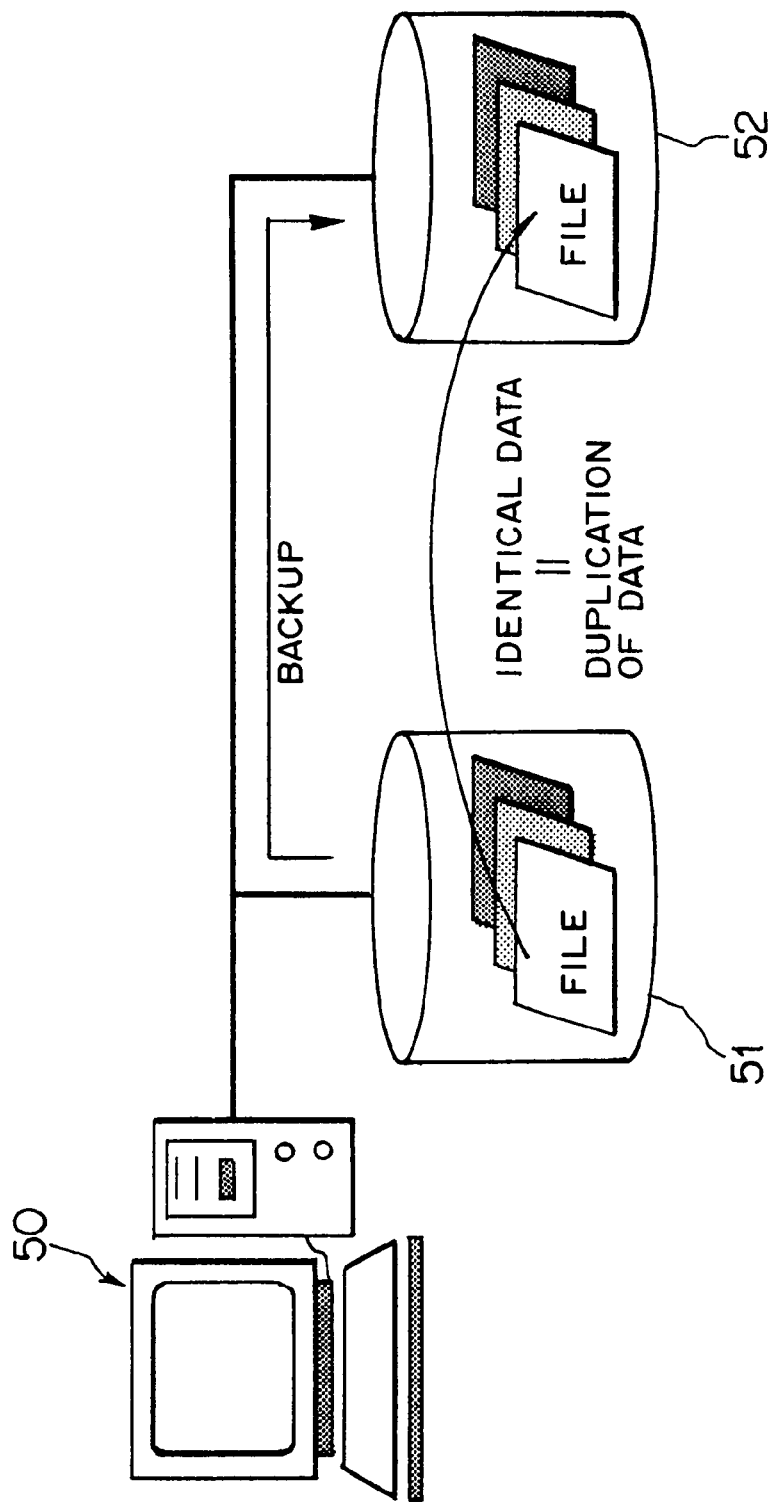
FIG. 18 is a schematic representation for explaining a popular backup operation.
Figure 19:
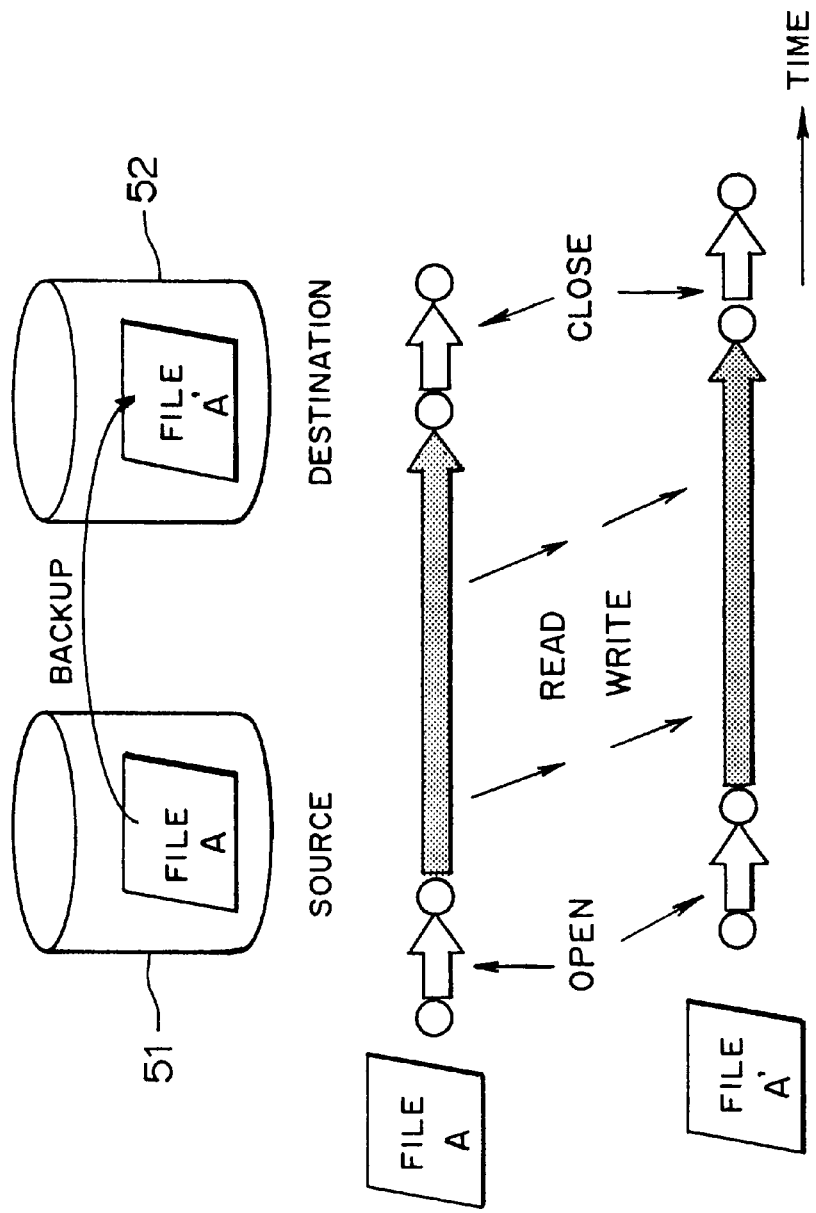
FIG. 19 is a schematic representation for explaining another popular backup operation.
Figure 20:
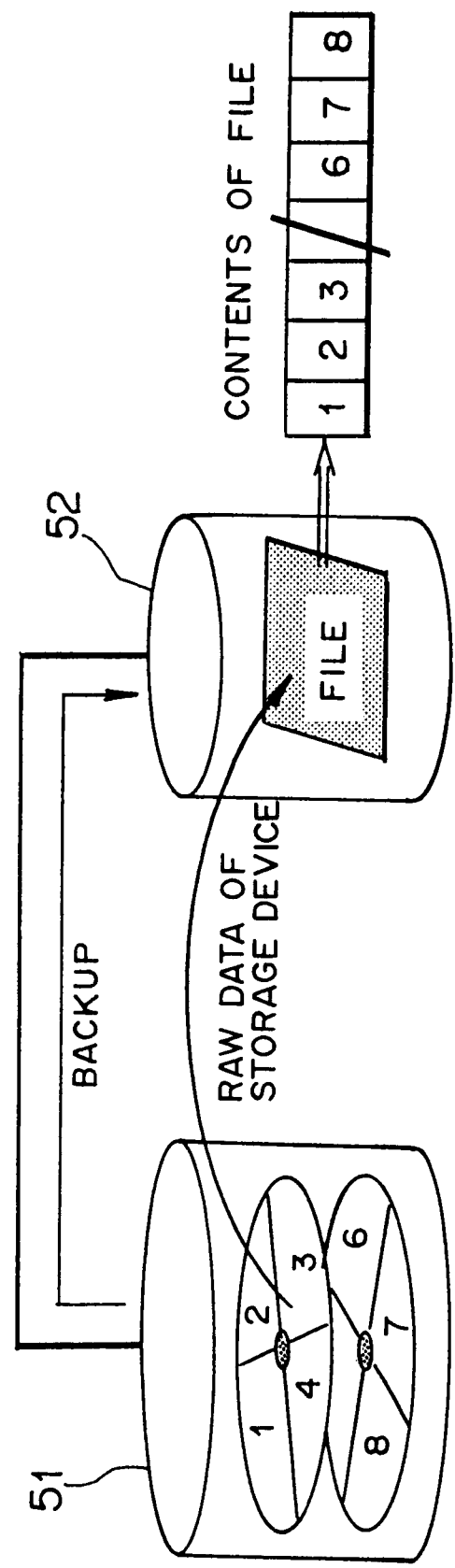
FIG. 20 is a schematic representation for explaining a backup method which utilizes disk images.
Figure 21:
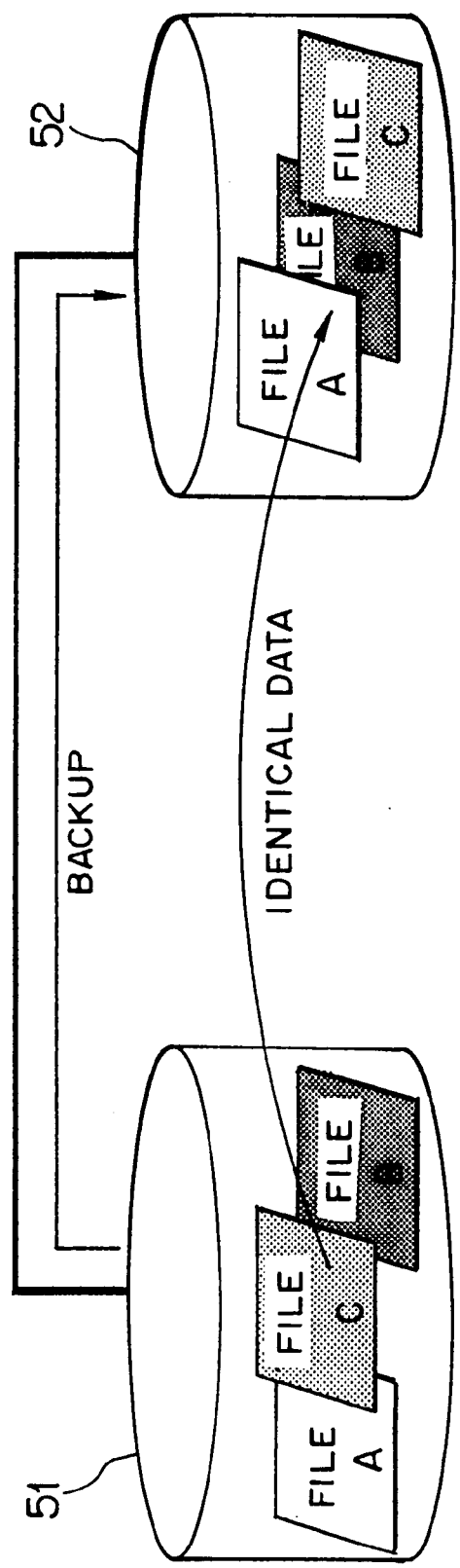
FIG. 21 is a schematic representation for explaining a backup method which utilizes file images.
Figure 22:
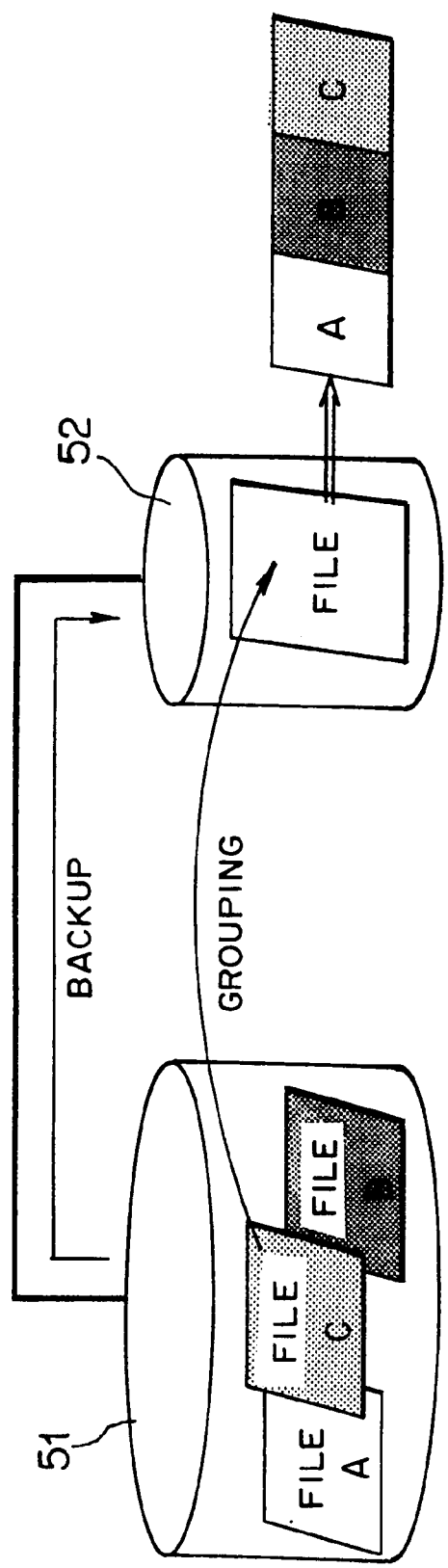
FIG. 22 is a schematic representation for explaining another backup method which utilizes file images.

First, the data files selected by the selection section 101 are grouped by the archive file creation section 102 under given conditions, to thereby produce an archive file [step g1 shown in FIG. 16 (or steps a1 to a8 shown in FIG. 3) and step g10 shown in FIG. 17].

Subsequently, a decision is made as to whether or not the grouping of data files has been repeated M times in step g1 shown in FIG. 16 (step g2 shown in FIG. 16). If the grouping of data files is not repeated M times (NO in step g2 shown in FIG. 16), the processing performed in step g1 shown in FIG. 16 is again performed.

In contrast, if the grouping of data files has been performed M times (YES in step g2 shown in FIG. 16), the data files to be copied are grouped again under given conditions immediately before being copied, thereby updating the contents of data of the archive file created as a result of grouping of data files M times (step g3 shown in FIG. 16, and step g11 shown in FIG. 17). The archive file and those data files that have failed to satisfy given conditions are recorded on the second storage section 30 (step g4 shown in FIG. 16, and step g12 shown in FIG. 17).

As mentioned previously, the data backup device 40 causes the archive file creation section 102 to group data files once again immediately before an archive file and data files that have failed to satisfy given conditions are copied. Therefore, the newest data files can be copied without fail, thereby contributing to improvements in the performance of the data backup device 40.

As a result of implementation of the data backup device according to the present invention, there can be obtained a data backup processing rate of 335 KB/s—which is about twice as fast as an existing data backup rate of 185 KB/s—under MS-Windows 95. The data backup processing rate was measured under conditions of: selecting data files of smaller than a given size (45 KB); grouping the thus-selected data files one time (M=1); grouping the data files into one archive file (N=1); and compressing the archive file when the archive file is stored in another storage device (i.e., the second storage device 30).

As mentioned previously, the data backup device 40 according to the present embodiment groups data files to be copied into one archive file before the data files are copied, thereby yielding the advantages of being able to reduce the time required to copy the data files to the second storage section 30 and being able to significantly improve the processing capability of the data backup device 40.

Further, since the data backup device 40 causes the archive file creation section 102 to create an archive file and the backup processing section 103 to copy the thus-created archive file in a distributed manner, the data backup device can speedily and accurately perform the processing operations, thus increasing the processing rate of the data backup device 40.

The individual sections provided in the data backup device 40 according to the present invention can be used in any combination to its application. For this reason, by virtue of the synergistic effect caused by the characteristics of the individual sections of the data backup device, the performance of the data backup device 40 can be significantly improved.

The present invention is not limited to the foregoing embodiment and may be modified in various ways without departing the scope of the invention.

What is claimed is:

1. A data backup device for use with a computer which stores data files stored in a first storage section into a second storage section in a duplicate manner, said device comprising:

a selection unit selecting, among the data files stored in the first storage section, a plurality of desired data files satisfying archive size optimizing conditions;

an archive file creation section creating an archive file comprising said plurality of selected desired data files in said first storage section; and a backup processing section for storing into the second storage section said archive file created by said archive file creation section.

2. The data backup device for use with a computer according to claim 1, wherein said selection section is configured to select a data file of a given size or smaller.

3. The data backup device for use with a computer according to claim 1, wherein said archive file creation section is operable to repeat the operation M times, and said selection section is configured in such a way that when said archive file creation section is performing the $m^{th}$ operation (where m is a natural number satisfying $m \leq M$ and $m \geq 2$), said selection section selects only those data files which have been modified or newly created since said archive file creation section performed the $m-1^{th}$ operation.

4. The data backup device for use with a computer according to claim 1, wherein said archive file creation section is operable to repeat the operation M times, and said selection section is configured in such a way that when said archive file creation section is performing the $m^{th}$ operation (where $m \leq M$ and $m \geq 2$), said selection section selects only those data files which have been modified or newly created since said archive file creation section performed the first operation.

5. The data backup device for use with a computer according to claim 1, wherein said archive file creation section is configured in such a way that, after having created an archive file, said archive file creation section compresses the thus-created archive file.

6. The data backup device for use with a computer according to claim 1, wherein said archive file creation section is configured in such a way that, after having compressed each of data files, said archive creation section creates archive files.

7. The data backup device for use with a computer according to claim 1,
wherein said archive file creation section is operable to repeat the operation M times, and said archive file creation section is configured in such a way that said archive file creation section adds the data file selected by the selection section during the mth operation (where $m \leq M$ and $m \geq 2$) of said archive file creation section to the archive files created during the $m-1^{th}$ operation of said archive file creation section.

8. The data backup device for use with a computer according to claim 1,
wherein said archive file creation section is operable to repeat the operation M times, and said archive file creation section is configured in such a way that, said archive file creation section deletes an existing data file corresponding to object data file to be added to the archive files and then adds the data files selected by said selection section during the $m^{th}$ operation (where $m \leq M$ and $m \geq 2$) of the archive file creation section to the archive files created during the $m-1^{th}$ operation of said archive file creation section.

9. The data backup device for use with a computer according to claim 1, wherein said backup processing section is configured to store into the second storage section the archive files and those data files that have failed to satisfy archiving optimizing conditions.

10. The data backup device for use with a computer according to claim 1, wherein said backup processing section is configured to compress the archive files and those data files that have failed to satisfy archiving optimizing conditions and then store the thus-compressed files into the second storage section.

11. The data backup device for use with a computer according to claim 1, wherein said backup processing section is configured in such a way that, after having added to the archive files, another archive file or those data files that have failed to satisfy archive size optimizing conditions, said backup processing section stores the archive files into the second storage section.

12. The data backup device for use with a computer according to claim 1, wherein said backup processing section is configured in such a way that, after having grouped into another archive file the archive files and those data files that have failed to satisfy given conditions, said backup processing section stores the thus-grouped archive files into the second storage section.

13. The data backup device for use with a computer according to claim 1, wherein said backup processing section is configured to cause said archive file creation section to create an archive file one time immediately before storing to the second storage section the archive files and those data files that have failed to satisfy given conditions.

14. A data backup method for use with a computer which stores data files stored in a first storage section into a second storage section in a duplicate manner, the method comprising:
selecting a plurality of desired data files, which satisfy archive size optimizing conditions, among the data files stored in the first storage section;
creating an archive file comprising said plurality of selected desired data files in said first storage section; and
storing said archive file into the second storage section after repeating said selecting of the data file and said creating of the archive file creation at least one time.

15. A computer-readable recording medium on which a data backup program is recorded for activating a computer in order to store data files stored in a first storage section into a second storage section in a duplicated manner, wherein said program instructs the computer to execute the following:
selecting a plurality of desired data files, which satisfy archive size optimizing conditions, in the first storage section;
creating an archive file comprising said plurality of selected desired data files; and
storing the created archive file into the second storage section.

* * * * *